United States Patent [19]
Klotz et al.

[11] Patent Number: 6,152,192
[45] Date of Patent: Nov. 28, 2000

[54] CONTROLLER FOR SYSTEM FOR FILLING GAS CYLINDERS WITH SINGLE GAS OR GAS MIXTURE

[75] Inventors: Maynard F. Klotz, Naperville, Ill.;
Gary K. Schueman, 180 Geneva Rd., Glen Ellyn, Ill. 60137

[73] Assignees: Welding Company of America, Northlake; Gary K. Schueman, Glynn Ellyn, both of Ill.

[21] Appl. No.: 09/290,578

[22] Filed: Apr. 13, 1999

Related U.S. Application Data

[63] Continuation-in-part of application No. 09/022,318, Feb. 11, 1998.

[51] Int. Cl.[7] .................................................. B65B 31/00
[52] U.S. Cl. ................................ 141/18; 141/83; 141/63; 141/48; 141/196; 141/197; 141/104; 141/105; 141/237
[58] Field of Search ................................ 141/2–4, 9, 18, 141/21, 48, 63, 83, 100, 104, 105, 196, 197, 237

[56] References Cited

U.S. PATENT DOCUMENTS

| | | | |
|---|---|---|---|
| 2,469,434 | 5/1949 | Hansen et al. | 141/3 |
| 3,620,265 | 11/1971 | Strople | 141/63 |
| 4,153,083 | 5/1979 | Imler et al. | 141/4 |
| 4,193,515 | 3/1980 | Purdy . | |
| 4,321,939 | 3/1982 | Fenwick . | |
| 4,333,503 | 6/1982 | Stefiuk . | |
| 4,527,600 | 7/1985 | Fisher et al. | 141/4 |
| 4,557,300 | 12/1985 | Jernberg | 141/5 |
| 4,582,100 | 4/1986 | Poulsen | 141/4 |
| 4,611,641 | 9/1986 | Carter, Sr. | 141/4 |
| 4,637,438 | 1/1987 | Weiss . | |
| 4,846,233 | 7/1989 | Fockens . | |
| 4,856,284 | 8/1989 | Mattiola et al. | 141/65 |
| 5,018,551 | 5/1991 | Pelissier . | |
| 5,022,442 | 6/1991 | Bird | 141/100 |
| 5,038,840 | 8/1991 | Fair . | |
| 5,139,057 | 8/1992 | Benedetti | 141/18 |
| 5,143,257 | 9/1992 | Austin et al. . | |
| 5,224,526 | 7/1993 | Mette et al. . | |
| 5,269,352 | 12/1993 | Gold . | |
| 5,359,522 | 10/1994 | Ryan . | |
| 5,495,875 | 3/1996 | Benning et al. | 141/83 |
| 5,513,678 | 5/1996 | Schultz et al. | 141/4 |
| 5,519,980 | 5/1996 | Guentert et al. . | |
| 5,540,251 | 7/1996 | Mayeaux | 137/88 |
| 5,597,020 | 1/1997 | Miller et al. . | |
| 5,604,681 | 2/1997 | Koeninger . | |

(List continued on next page.)

OTHER PUBLICATIONS

Gas Technology Systems, represented by D.Barry Weir & Associates, 1071 North Batavia Boulevard—Bldg. A, Orange, CA.

*Primary Examiner*—J. Casimer Jacyna
*Attorney, Agent, or Firm*—Seyfarth, Shaw

[57] ABSTRACT

A cylinder-filling system includes plural manifolds, for respectively coupling to groups of product containers to be filled, each manifold being connected through suitable valving and pumps to sources of different compressed gases. Respectively connected to the manifolds are reference cylinders which are in turn connected to load cells. A processor, coupled to a touch screen display, executes a program routine which enables user selection of the gas or gas mixture to be added through each manifold, including the identity and proportions of gases in each mixture and the order in which they are to be added, a number of operating parameters including vent and evacuation pressures, number of purge cycles, purge gas, alarm levels and pump and valve operating delay times. The processor controls automatic calculation of gas mixture fill weights from mixture proportions, and controls manual or automatic filling of the containers. The processor recalculates target weights for the gases based upon a predetermined fraction of variance between original target weights and fill amounts after a settling time, and controls the rate of filling separately for each gas based on the target amount of the gas to be added.

64 Claims, 32 Drawing Sheets

U.S. PATENT DOCUMENTS

| | | |
|---|---|---|
| 5,642,761 | 7/1997 | Holbrook . |
| 5,649,577 | 7/1997 | Farakas . |
| 5,657,800 | 8/1997 | Campbell . |
| 5,673,736 | 10/1997 | Farkas . |
| 5,687,779 | 11/1997 | Andersson et al. . |
| 5,810,058 | 9/1998 | Kountz et al. ............... 141/83 |
| 5,868,176 | 2/1999 | Barajas et al. ............... 141/83 |
| 5,992,478 | 11/1999 | Micke et al. ............... 141/196 |

Production Reporting System
| GAS RECAP | PRODUCTION | MENU | MAN-1 FDA | MAN-2 FDA |
|---|---|---|---|---|
| 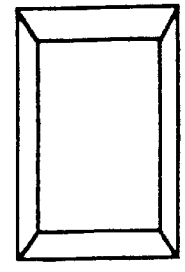 | 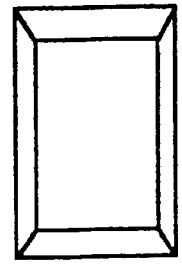 | 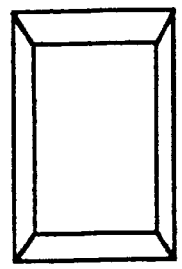 | 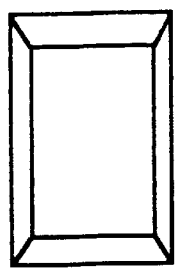 | 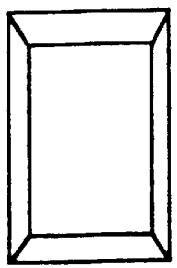 |
FIG-7

FORMULA SELECT TO EDIT

MANIFOLD IDLE

| | | F/PART | PSIG | Co2 | O2 | N2 | AR | He |
|---|---|---|---|---|---|---|---|---|
| ENTER | 0 | | 0.0 | 0.0 | 0.0 | 0.0 | 0.0 | 0.0 |
| ENTER | 1 | IGAS002C2 | 2216 | 2.0 | 0.0 | 0.0 | 98.0 | 0.0 |
| ENTER | 2 | IGAS002C3 | 2640 | 2.0 | 0.0 | 0.0 | 98.0 | 0.0 |
| ENTER | 3 | IGAS005C2 | 2216 | 5.0 | 0.0 | 0.0 | 95 | 0.0 |
| ENTER | 4 | | 0.0 | 0.0 | 0.0 | 0.0 | 0.0 | 0.0 |
| ENTER | 5 | | 0.0 | 0.0 | 0.0 | 0.0 | 0.0 | 0.0 |
| ENTER | 6 | | 0.0 | 0.0 | 0.0 | 0.0 | 0.0 | 0.0 |
| ENTER | 7 | | 0.0 | 0.0 | 0.0 | 0.0 | 0.0 | 0.0 |
| ENTER | 8 | | 0.0 | 0.0 | 0.0 | 0.0 | 0.0 | 0.0 |
| ENTER | 9 | | 0.0 | 0.0 | 0.0 | 0.0 | 0.0 | 0.0 |
| ENTER | 10 | | 0.0 | 0.0 | 0.0 | 0.0 | 0.0 | 0.0 |
| ENTER | 11 | | 0.0 | 0.0 | 0.0 | 0.0 | 0.0 | 0.0 |
| ENTER | 12 | | 0.0 | 0.0 | 0.0 | 0.0 | 0.0 | 0.0 |
| ENTER | 13 | | 0.0 | 0.0 | 0.0 | 0.0 | 0.0 | 0.0 |
| ENTER | 14 | | 0.0 | 0.0 | 0.0 | 0.0 | 0.0 | 0.0 |
| ENTER | 15 | | 0.0 | 0.0 | 0.0 | 0.0 | 0.0 | 0.0 |
| ENTER | 16 | | 0.0 | 0.0 | 0.0 | 0.0 | 0.0 | 0.0 |
| ENTER | 17 | | 0.0 | 0.0 | 0.0 | 0.0 | 0.0 | 0.0 |
| ENTER | 18 | | 0.0 | 0.0 | 0.0 | 0.0 | 0.0 | 0.0 |
| ENTER | 19 | | 0.0 | 0.0 | 0.0 | 0.0 | 0.0 | 0.0 |
| ENTER | 20 | | 0.0 | 0.0 | 0.0 | 0.0 | 0.0 | 0.0 |
| ENTER | 21 | | 0.0 | 0.0 | 0.0 | 0.0 | 0.0 | 0.0 |
| ENTER | 22 | | 0.0 | 0.0 | 0.0 | 0.0 | 0.0 | 0.0 |
| ENTER | 23 | | 0.0 | 0.0 | 0.0 | 0.0 | 0.0 | 0.0 |
| ENTER | 24 | | 0.0 | 0.0 | 0.0 | 0.0 | 0.0 | 0.0 |

FIG-9

| SYSTEM TIMERS MANIFOLD #1 | 95 | MANIFOLD #2 |
|---|---|---|
| VENT OPEN DELAY | 4.0 | 4.0 |
| VENT CLOSE AFTER SET POINT | 5.0 | 0.3 |
| VACUUM VALVE OPEN DELAY | 4.0 | 4.0 |
| VACUUM PUMP START DELAY | 0.0 | 4.0 |
| VACUUM SET POINT HOLD | 5.0 | 5.0 |
| VACUUM PUMP STOP DELAY | 4.0 | 2.6 |
| DELAY READING PURGE PRESSURE | 5.0 | 5.0 |
| VACUUM TOO SHORT FILL DELAY | 2.0 | |
| GAS PUMP START DELAY | 5.0 | 5.0 |
| PURGE AT PRESSURE DELAY | 5.0 | 5.0 |
| SLOW FLOW VALVE CLOSE DELAY | 0.1 | 0.1 |
| AT WEIGHT SETTLE TIME | 10 | 10.0 |
| NEXT MENU | | |

FIG-10

| SYSTEM TIMERS MANIFOLD #1 | | MANIFOLD #2 |
|---|---|---|
| VENT OPEN DELAY | 4.0 | 4.0 |
| VENT CLOSE AFTER SET POINT | 5.0 | 0.3 |
| VACUUM VALVE OPEN DELAY | 4.0 | 4.0 |
| VACUUM PUMP START DELAY | 0.0 | 4.0 |
| VACUUM SET POINT HOLD | 5.0 | 5.0 |
| VACUUM PUMP STOP DELAY | 4.0 | 2.6 |
| DELAY READING PURGE PRESSURE | 5.0 | 5.0 |
| VACUUM TOO SHORT FILL DELAY | 2.0 | |
| GAS PUMP START DELAY | 5.0 | 5.0 |
| PURGE AT PRESSURE DELAY | 5.0 | 0 |
| SLOW FLOW VALVE CLOSE DELAY | 0.1 | 1 |
| AT WEIGHT SETTLE TIME | 10 | 0 |

| 1 | 2 | 3 | 4 |
|---|---|---|---|
| 5 | 6 | 7 | 8 |
| 9 | 0 | Enter | |

NEXT   MENU

FIG-10A

| SYSTEM TIMERS MANIFOLD #1 | | MANIFOLD #2 |
|---|---|---|
| BLEED VALVE OPEN DELAY | 3.0 | 3.0 ◄---- 95 |
| BLEED VALVE CLOSE DELAY | 4.0 | 4.0 |
| GAS VALVE OPEN DELAY | 4.0 | 4.0 |
| GAS VALVE CLOSE DELAY | 4.0 | 4.0 |
| MAN 1 & 2 GAS NO FLOW ALARM DELAY | 600.0 | |
| CO2 BY-PASS DELAY | 5.0 | |
| VAC NO FLOW ALARM DELAY | 600.0 | |

NEXT    MENU

FIG-11

SYSTEM SETPOINT

| | | |
|---|---|---|
| FLOW INCREASE PER 10-SEC | 100.0  92  20.0 | Grams Grams |
| CLOSE FULL FLOW EARLY | | |
| VACUUM SET POINT | 25.0 | Hg |
| VENT SET POINT | 10.0 | PSIG |
| PURGE SET POINT | 100.0 | PSIG |

MANIFOLD NO-1

| | MAX | |
|---|---|---|
| VAC. TRANSDUCER | 30.0 | |
| PRESS TRANSDUCER | 4000.0 | |
| TEMPERATURE | 257.0 | |

| | | |
|---|---|---|
| HIGH PRESSURE ALARM | 3200.0 | PSIG |
| HIGH TEMP. ALARM | 130.0 | TEMP |
| CO2 FULL FLOW OPEN | 175.0 | PSIG |
| MAN-1 CORRECTION RATE | 10.0 | |
| MAN-2 CORRECTION RATE | 10.0 | |

MANIFOLD NO-2

| | MAX 92 | |
|---|---|---|
| VAC. TRANSDUCER | 30.0 | |
| PRESS TRANSDUCER | 4000.0 | |
| TEMPERATURE | 257.0 | |

94 → COMP INACTIVE

MENU        NEXT

FIG-12

SYSTEM SETPOINT

MANIFOLD NO-1

| | |
|---|---|
| CO2 F-FLOW IF > THAN | 100.0 |
| O2 F-FLOW IF > THAN | 100.0 |
| N2 F-FLOW IF > THAN | 100.0 |
| AR F-FLOW IF > THAN | 300.0 |
| HE F-FLOW IF > THAN | 200.0 |

MANIFOLD NO-2

| | |
|---|---|
| CO2 F-FLOW IF > THAN | 100.0 |
| O2 F-FLOW IF > THAN | 100.0 |
| N2 F-FLOW IF > THAN | 100.0 |
| AR F-FLOW IF > THAN | 300.0 |
| HE F-FLOW IF > THAN | 200.0 |

MENU  NEXT

FIG-13

SENSOR SELECT

SENSOR OUTPUT  4000                    SENSOR OUTPUR  4000

MF/1 VAC SENSOR
INACTIVE

MF/1 VAC SENSOR
INACTIVE

SENSOR OUTPUT  0                       SENSOR OUTPUT  0

MF/1 PRESS SENSOR
INACTIVE

MF/1 PRESS SENSOR
INACTIVE

SENSOR OUTPUT  0                       SENSOR OUTPUT  0

MF/1 T/C (A) SENSOR
INACTIVE

MF/1 T/C (B) SENSOR
INACTIVE

RETURN

FIG-14

"FORMULA EDITOR"

FOR # 01
CYL. FILL PSIG 2216
FILL LIMIT PSIG 2216
Part No. IGAS002C2

[ INDUST GAS A ] [ INDUST GAS B ] [ MEDICAL GAS ] [ SPEC. GAS ]

TOTAL % 100

| % | CO2 | O2 | N2 | AR | He |
|---|---|---|---|---|---|
| ORD | 2.0 | 0 | 0 | 98.0 | 0 |
| M1 | 61.8 | 0 | 0 | 2753.9 | 0 |
| M2 | 61.8 | 0 | 0 | 2753.9 | 0 |
|  | 1 | 0 | 0 | 2 | 0 |
|  | +2.2 | 0 | 0 | +13.0 | 0 |
|  | +1.7 | 0 | 0 | +11.5 | 0 |

[ CAL. ] [ MAIN MENU ] [ WRITING ]

FIG-15

"FORMULA EDITOR"

FOR #  01
CYL. FILL PSIG  2216
FILL LIMIT PSIG  2216
Part No. IGAS002C2

TOTAL %  100

| % | CO2 | O2 | N2 | AR | He |
|---|---|---|---|---|---|
|  | 2.0 | 0 | 0 | 98.0 | 0 |
| ORD | 61.8 |  |  | 2753.9 | 0 |
| M1 | 61.8 | 1800 | 2015+ | 2400 | 0 |
| M2 | +2.2 | 1800+ | 2265 | 2400+ | 0 |
|  | +1.7 | 2015 | 2265+ |  | 0 |

← 100

INDUST GAS A    MEDICAL GAS
INDUST GAS B    SPEC. GAS

CAL.    MAIN MENU    WRITING

FIG-15A

GAS TOLERANCE TABLE

| % / GAS TO % / GAS | IND / GAS | MED / GAS | SPC / GAS |
|---|---|---|---|
| 0 TO 5.0 | 5.0 | 5.0 | 2.0 |
| 5.1 TO 24.0 | 5.0 | 5.0 | 2.0 |
| 24.1 TO 50.0 | 4.0 | 4.0 | 2.0 |
| 50.1 TO 100.0 | 2.0 | 2.0 | 2.0 |

RETURN

FIG-16

PRODUCTION DATA

INDUSTRIAL GAS A

FOR NO. 5                01/26/99

PART NO. IGAS005C3

| CO2 | O2 | He | N2 | AR | PSIG |
|---|---|---|---|---|---|
| 5.0 | 0.0 | 0.0 | 95.0 | 0.0 | 2640 |

| Qty | Size | Cyl/Vol | Total Qty |
|---|---|---|---|
| 0 | J | 300 | 490 |
| 0 | H | 250 | 0 |
| 0 | M | 150 | 0 |
| 0 | | 0 | 0 |
| 0 | | 0 | 0 |
| 0 | | 0 | 0 |
| 0 | | 0 | 0 |
| 0 | | 0 | 0 |
| 0 | | 0 | 0 |
| 0 | | 0 | 0 |

[ CAL ]  [ CLR ]  [ SAVE ]  [ AUTO ]  [ MAN ]

FIG-17

PRODUCTION DATA

| | | | | | FOR NO. | 5 | |
|---|---|---|---|---|---|---|---|
| INDUSTRIAL GAS A | | | | | PART NO. | | IGAS005C3 |
| CO2 | O2 | He | N2 | | AR | | PSIG |
| 5.0 | 0.0 | 0.0 | 95.0 | | 0.0 | | 2640 |

| Size | Cyl/Vol | Total Qty |
|---|---|---|
| J | 300 | 490 |
| H | 250 | 0 |
| M | 150 | 0 |
| | 0 | 0 |
| | 0 | 0 |
| | 0 | 0 |
| | 0 | 0 |
| | 0 | 0 |

Qty
0
0
0
0
0
0
0
0

| 1 | 2 | 3 | 4 |
| 5 | 6 | 7 | 8 |
| 9 | 0 | Enter | |

[CAL] [CLR] [SAVE] [AUTO] [MAN]

PRODUCTION REPORT    FOR NO. 01                01/26/99

| GAS/CAT | MANIFOLD I | | | | PART NO. | d | |
|---|---|---|---|---|---|---|---|
| CO2 | O2 | N2 | Ar | He | | | PSIG |
| 5.0 | 5.0 | 500.0 | 0.0 | 0.0 | | | 1 |

| Qty | Size | Total Cubic Feet | | Gas Used | | |
|---|---|---|---|---|---|---|
| 0 | | 0.0 | | Co2 | 0.60 | Lbs |
| 0 | 3 | 0.0 | | O2 | 525.0 | SCF |
| 0 | 2 | 0.0 | | N2 | 63000.0 | SCF |
| 0 | 2 | 0.0 | | AR | 0.0 | SCF |
| 0 | | 0.0 | | He | 0.0 | SCF |
| 0 | | 0.0 | | | | |
| 50.0 | | 8750.0 | | | | |
| 50.0 | | 1250.0 | | | | |
| 50.0 | | 500.0 | | | | |
| 150.0 | Vol | 10500.0 | | | | |

[ READING ]
[ MENU ]
[ CLEARING ]

FIG-18

PRODUCTION RECAP GAS REPORT

DATE 26/01/99

Gas Weighed

Co2 97168
OXYGEN 0
NITROGEN 294774205
ARGON 4504836
HELIUM 254911

CALCULATE          PRINT          CLEAR TOTALS

FIG-19

GAS MIXTURE PRODUCTION & ANALYSIS RECORD

Date: 01/26/99

Company: Interstate Valweld Sales Corp.
Address: 1801 Marinette Ave
Marinette, WI 54143

Product Category: Industrial Gas B    Lot # _____    Mix # 16

MANIFOLD # _____

| Comp | CARBON DIOXIDE | OXYGEN | NITROGEN | ARGON | HELIUM |
|---|---|---|---|---|---|
| Percent | 2.5 | 0.0 | 0.0 | 7.5 | 90.0 |
| Add Order | 1 | 0 | 0 | 2 | 3 |
| Weight | 76.2 | 0.0 | 0.0 | 209.6 | 265.1 |
| Pressure | 42 | 0 | 0 | 222 | 2773 |
| Temperature | 69 | 0 | 0 | 72 | 101 |

| Qty | Size | Qty/Rel | PART NO. | Qty. | Size | Qty/Rel |
|---|---|---|---|---|---|---|
| 0 | 0 | ___ | ___ | 0 | 0 | ___ |
| 0 | 0 | ___ | ___ | 0 | 0 | ___ |
| 0 | 0 | ___ | ___ | 0 | 0 | ___ |
| 0 | 0 | ___ | ___ | 0 | 0 | ___ |

| PART NO. | | | |
|---|---|---|---|
| ___ | ___ | ___ | ___ |
| ___ | ___ | ___ | ___ |
| ___ | ___ | ___ | ___ |
| ___ | ___ | ___ | ___ |

FIG-20

Time: 0.4729167

MEDICAL CYLINDER FILLING RECORD    Date: 01/26/99

Company Name: Interstate Valweld Sales Corp.
Address: 1801 Marinette Ave
Marinette, WI 54143

Product: MANIFOLD IDLE
Lot #
Mix #   O

| Fill Qty | Cyl Size | Released Qty |
|---|---|---|
| 20 | J | |
| 20 | H | |
| 0 | | |
| 0 | | |
| 0 | | |
| 0 | | |
| 0 | | |
| 0 | | |
| 0 | | |
| 0 | | |

Cylinder Pre-Fill Inspections
Cylinder - Markings: X
Cylinder Odor Test: X
Cylinder Ring Test: X
Cyl. & Valve Insp: X
Cylinder Test Date: X
Cylinder Label Insp: X
Cylinders Vacuumed: X
Cylinder Purge Cycles: O

| Comp: | $CO_2$ | $O_2$ | $N_2$ | He |
|---|---|---|---|---|
| Percent: | 5 | 95 | 0 | 0 |
| A/Order: | 1 | 2 | 0 | 0 |
| Weight: | 484 | 215 | 0 | 0 |
| Pressure: | 260 | 2670 | 0 | 0 |
| Temp: | 66 | 78 | 0 | 0 |
| S/Lot: | | | | |

Cylinder Post-Fill Inspections
Cylinder Mid Leak Test:
Cylinder Final Leak Test:
Cylinder Label:
Label Used:
Label Verify:
Roll Cyl:
Valve CGA Outlet:

Filled By:
Analyzed By:
Approved For Distribution
By:                Date:

REMARKS & LOT # STICKER:

FIG-21

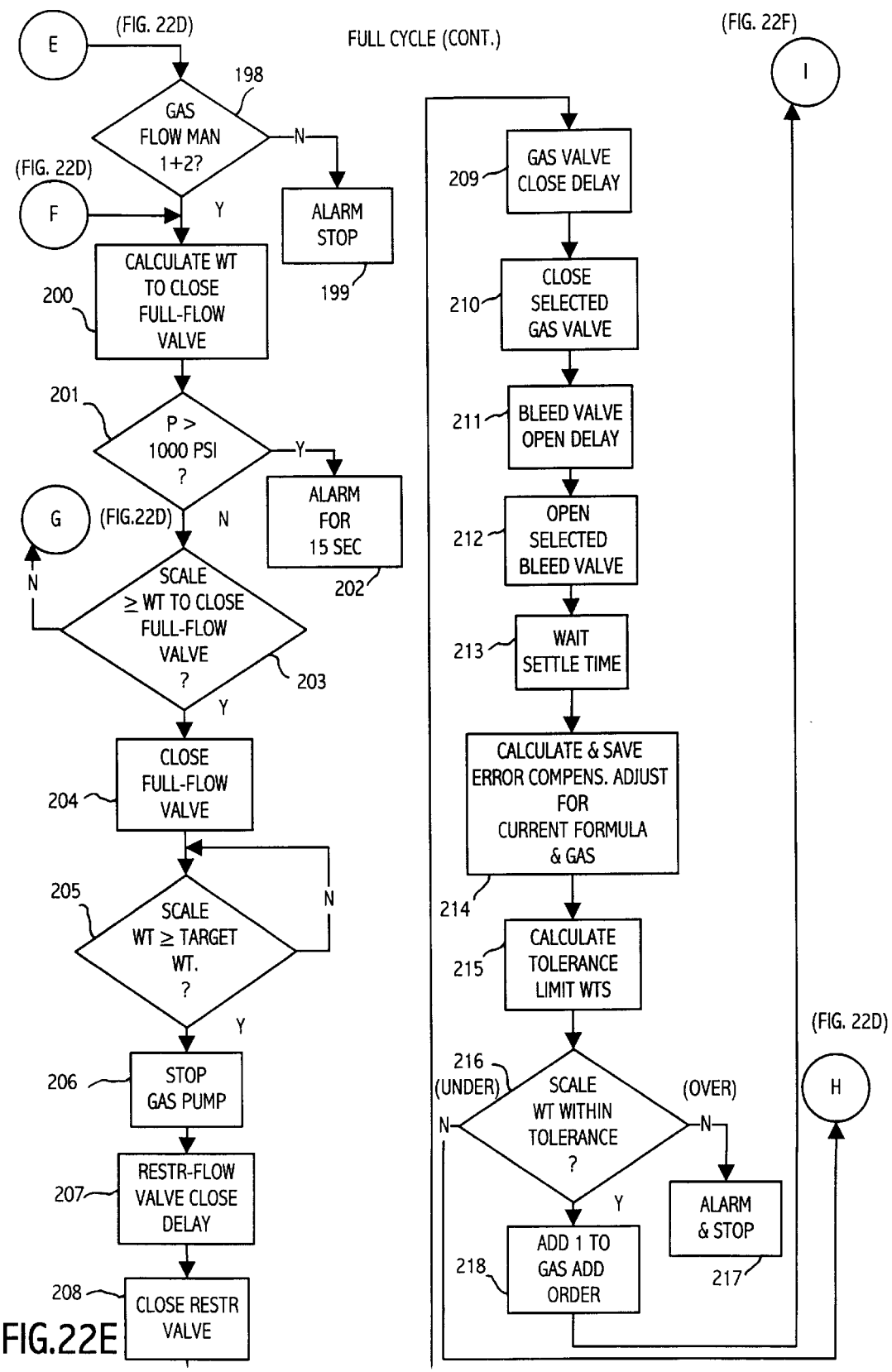

CONTROLLER FOR SYSTEM FOR FILLING GAS CYLINDERS WITH SINGLE GAS OR GAS MIXTURE

CROSS REFERENCE TO RELATED APPLICATION

This is a continuation-in-part of U.S. application Ser. No. 09/022,318, filed Feb. 11, 1998, and still pending, entitled "Controller for Tank Filling System."

BACKGROUND OF THE INVENTION

The present invention relates to a controller used in a system for automatically filling cylinders or tanks with a single compressed gas or a mixture of compressed gases, such as oxygen, nitrogen, argon, helium and carbon dioxide and, particularly, to such a controller which is field-configurable to match the specifics of the user's system and to accommodate changes thereto. The present invention is an improvement of the automatic filling system disclosed in our copending application Ser. No. 09/022,318, filed Feb. 11, 1998, entitled "Controller for Tank Filling System", the disclosure of which is incorporated herein by reference.

Gases such as oxygen, nitrogen and argon have widespread use throughout industry and medicine. Manufacturing companies and hospitals commonly purchase their needs of gases from gas distributors that take liquefied oxygen, nitrogen, argon, etc. from large storage tanks and deliver them as gases to smaller containers, which are usually cylindrically shaped and, therefore, are commonly referred to as "cylinders." Accordingly, hereinafter, the word "cylinders" will be used to refer to containers of the type to be filled with the systems controlled by the controller of the present invention, but it will be understood that the invention is applicable for filling containers having shapes other than cylindrical. The distributors usually own the cylinders and send the cylinders filled with compressed gases to their customers. When the cylinders are spent, they are returned to the gas distributor, who refills them with compressed gas.

For many years, the process of filling the cylinders with gases or gas mixtures was performed manually. The gas distributor would have large storage cylinders filled with liquefied gases, such as oxygen, nitrogen, argon, carbon dioxide and helium. Via a manifold, he would simultaneously fill ten, twenty or more cylinders. As a first step, the cylinders were vented, meaning that whatever gas was in the cylinders was bled off. Usually a vacuum pumping system was connected to the manifold to draw a vacuum to evacuate the cylinders. Often one or more purges were performed, meaning, using a different pumping system, the cylinders would be filled with some of the compressed gas, which was then vented. Then, the cylinders were again evacuated. This purging cycle could be repeated as many times as was necessary with whichever gas was necessary to achieve the desired purity of the cylinders. Finally, the cylinders were filled with the specified gas or gas mixture to a predetermined pressure at a stated temperature.

In the process of making gas mixtures, two predominant methods existed. One method was to fill the cylinders with each gas to a different partial pressure to obtain the desired gas mixture ratios. The other method was to weigh in different amounts of various gases to obtain the desired gas ratios. In performing these various steps, the operator would monitor the temperature of the cylinders and the pressures in the system and, in some cases, a scale representing the weight of the gas in the cylinders. For example, when the cylinders were vented, the operator would monitor the pressure in the cylinders and when it reached a predetermined level, he would know it was time to start the evacuation process. Again, he would monitor the pressure to determine when the next step would be taken. The entire process was very time consuming and resulted in much lost time for the operator and the equipment. Also, the pumps, which were expensive, were used only a small fraction of the day.

It has been recognized that computer control of the filling process would substantially reduce the time it would take to vent, evacuate and fill cylinders, and thereby increase the number of cylinders that an operator could fill during a given time period. There are computerized systems in the marketplace. They are usually made for a particular system to fill cylinders with a particular gas or gas mixture. Such a system often incorporates one or more fill pumps for each manifold and a vacuum pump for each manifold. With this type of system, one group of cylinders is filled with one gas or mixture through one manifold, while another manifold is used to vent and evacuate another group of cylinders. A gas distributor tells the manufacturer of the controller which conditions he plans to utilize and then the manufacturer programs the computer to match the distributor's configuration. Other information is added to the computer program by the manufacturer, such as details on the performance characteristics of the pressure and temperature transducers, the electronically controllable valves, etc.

Thus, the manufacturers of currently available controllers make each controller to the order of the customer, each with a particular computer program. If the gas distributor's needs change, e.g., he wants to purchase a different pressure transducer because the original one is no longer operable, or he wants to adjust operating parameters, currently available controllers would have to be reprogrammed by the manufacturer.

Furthermore, presently available computerized systems do not provide automatic purging, where purging is desired, for a selected number of purging cycles with a selectable gas. Also, they do not calculate the weights of each gas add for gas mixtures requested by the customer, nor do they calculate maximum fill pressures when condensable gases are involved in the mixture, and automatically recalculate the fill weights based on the new pressure limit. Presently available systems must have the gas mixture formulas constantly adjusted as changes in the equipment, operation and environment change. This requires constant operator attention. Also, they do not leave the option for either automatic calculation or manual entry.

Gases used for medical purposes, such as those used in hospitals, are considered drugs and, therefore, are regulated by the Food and Drug Administration ("FDA"). The FDA specifies steps to be performed to achieve a certain level of purity and to check the integrity of the cylinders, and requires reports which must comply with certain FDA regulations. In prior systems the purification and integrity checking must be manually monitored and reports must be manually prepared.

SUMMARY OF THE INVENTION

It is a general object of the invention to provide an improved controller for a container filling system which avoids the disadvantages of prior controllers while affording additional structural and operating advantages.

An important feature of the invention is the provision for cylinder-filling systems of a controller which is field configurable to enable the user to easily and simply program the controller to match the configuration of his system.

Another feature is the provision of a controller of the type set forth, which enables an operator automatically to track cylinders by gas category, product or mixture and cylinder size, and also to total the number of cylinders filled, their volumes and the total volume of each gas used in filling the cylinders.

Another feature is the provision of a controller of the type set forth, which enables the operator to obtain production reports with answers to questions about pre-production, production and post-production operating steps and conditions during the processing of the cylinders, particularly for medical usage.

Another feature of the present invention is the provision of a controller for a cylinder filling system, wherein the operator can select a number of purging cycles and the purge gas, with the purges being automatically performed by the controller before filling.

Another feature is the provision of a controller for a cylinder filling system which produces visual and/or audible alarms in the presence of excessive cylinder temperature or pressure, under- or over-weight for gas component adds, inoperativeness of any of the transducers or pumps, low air pressure for controlling valves, as well as alarms to remind operators when it is time to perform some external manual function.

Another feature is the provision of a controller for a cylinder filling system in which the operator can enter requested gas mixture percentages and desired fill pressure at a specified temperature and the controller will perform the calculations for the correct weight of each gas to add.

Another feature is the provision of a controller for a cylinder filling system in which the operator can enter a requested gas mixture percentage with condensable gases in it and the desired fill pressure at 70 degrees F and the controller will determine the actual pressure that the mixture can be filled to, without causing the gas to condense out.

Another feature is the provision of a controller for a cylinder filling system which constantly monitors the actual result of each gas fill step as compared to the desired result and continually adjusts the desired target to improve the accuracy of the system as equipment, processes or environmental conditions change.

Another feature is the provision of a controller for a cylinder filling system which allows a list of commonly filled gases and gas mixtures to be stored for easy access and retrieval by the operator, but protected from change to all but authorized personnel via a security device.

A still further feature of the invention is the provision of a controller of the type set forth, which automatically slows the rate of filling when a cylinder has been filled to a predetermined fraction of the target amount.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIGS. 4–21 depict various touch screen displays on the monitor used during setup and operation of the controllers of FIGS. 1–3; and FIGS. 22A–22F depict flow charts for software routines of the controllers of FIGS. 1–3.

DESCRIPTION OF THE PREFERRED EMBODIMENT

Figure 1:
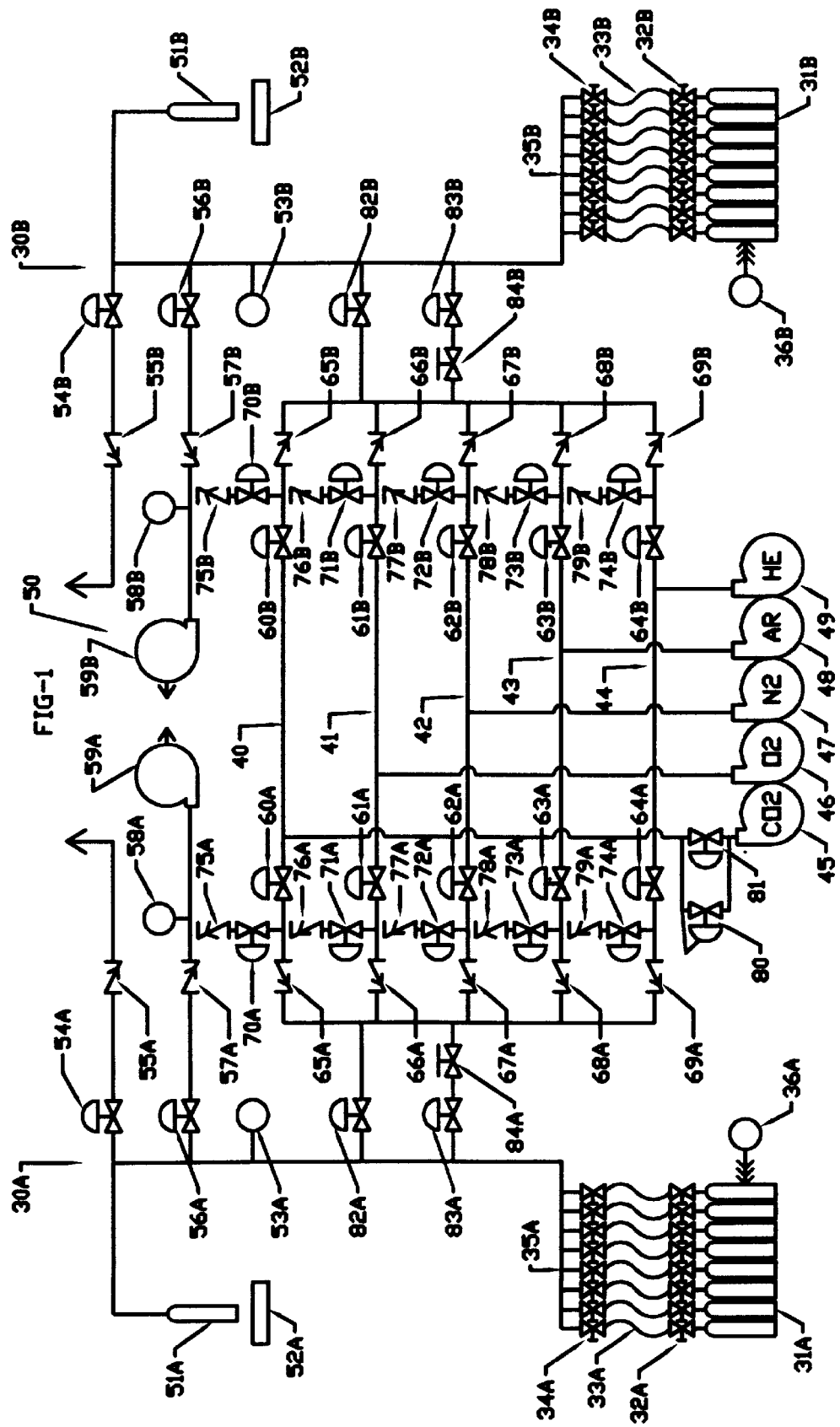
FIG. 1 is a schematic gas-flow diagram of a cylinder-filling system including a controller incorporating the features of the present invention.

Referring to FIG. 1, there is illustrated a cylinder filling system, generally designated by the numeral 30, of the type with which a controller 50 of the present invention may be used. The filling system 30 has two sections, respectively designated 30A and 30B, which are substantially identical in the illustrated embodiment, whereby like parts of each section will be given the same reference numbers with the suffixes "A" or "B", respectively. While the filling system 30 is illustrated with two such sections, it will be appreciated that the principles of the present invention are applicable to a system with a single section or with more than two sections. Each of the sections is designed for filling a plurality of product cylinders 31A or 31B, respectively provided with manual valves 32A, 32B which are, in use, coupled via flexible conduits 33A, 33B to the manual valves 34A, 34B of manifolds 35A, 35B. The valves 34A, 34B are respectively permanently associated with the manifolds 35A, 35B and, similarly, the valves 32A, 32B are respectively permanently associated with the product cylinders 31A, 31B. While, in the illustrated embodiment, each of the manifolds is depicted with eight outlets for filling eight cylinders, it will be appreciated that the manifolds could have any number of outlets for filling like numbers of cylinders. Furthermore, while the manifolds 35A, 35B are shown having the same number of outlets, they could have different numbers of outlets and, while the cylinders 31A are illustrated as the same size and type as the cylinders 31B, they could be different.

The filling system sections 30A and 30B are also respectively provided with temperature transducers 36A, 36B, which may be thermocouples and may be physically attached to or coupled by infrared to a selected one of the associated group of product cylinders 31A or 31B. Each temperature transducer provides an electrical signal representing the temperature of the particular product cylinder to which it is coupled, which is then deemed to be representative of the other product cylinders coupled to the same manifold.

The filling system 30 includes a plurality of gas conduits 40–44, respectively connected to the outlets of plural gas supply pumps 45–49, the inlets of which are, respectively, coupled to a plurality of sources of compressed gas (not shown). For purposes of illustration, five different gases are illustrated, viz., carbon dioxide, oxygen, nitrogen, argon and helium, but it will be appreciated that the system 30 could be used with any number of different gases. As will be explained more fully below, each gas supply source has a single pump which is connected in common, through a gas conduit, to each of the filling system sections 30A, 30B, since this is the most cost-effective arrangement in view of the relatively high cost of pumps. However, it will be appreciated that, if desired, separate sets of gas pumps could be provided for each of the filling system sections.

The foregoing components of the filling system 30, with the possible exception of the temperature transducers 36A, 36B, are typically provided at a user facility, whereas the remainder of the components in FIG. 1, to be described hereinafter, form a part of the controller 50 in accordance with the present invention. Thus, these latter components will typically be packaged as a unit on a common frame for installation at a user facility and have sections corresponding to those of the user's filling system for coupling to the user's manifolds. While this arrangement facilitates sale of the controller 50 as an independent unit, it will be appreciated that it is not necessary to the principles of the present invention.

The controller 50 includes reference cylinders 51A and 51B which are, respectively, disposed on scales 52A, 52B. The scales may be load cells or other types of weight-sensing devices which produce an electrical output signal representative of the weight of gas in the reference cylinder. Preferably, the scales and the reference cylinders are disposed in a vibration-eliminating and draft-proof enclosure (not shown).

The controller 50 also includes pressure transducers 53A, 53B, respectively coupled to the manifolds 35A and 35B for providing electrical signals representative of the pressures in the manifolds. Also respectively coupled to the manifolds are solenoid-actuated vent valves 54A and 54B, respectively coupled to atmosphere through check valves 55A and 55B. Also respectively coupled to the manifolds 35A and 35B are solenoid-actuated vacuum valves 56A and 56B, respectively coupled through check valves 57A, 57B and vacuum pressure transducers 58A, 58B to the inlets of vacuum pumps 59A, 59B, the outlets of which are coupled to atmosphere. The vacuum pressure transducers 58A, 58B provide electrical signals representing the amount of vacuum in the manifolds when the vacuum pumps are operating and the vacuum valves are open.

The gas conduits 40–44 are coupled to each of the manifolds 35A and 35B through double block and bleed assemblies. Thus, the conduits 40–44 are, respectively, coupled to solenoid-actuated gas block valves 60A–64A and also to solenoid-actuated gas block valves 60B–64B, the gas block valves being respectively coupled in series with check valves 65A–69A and 65B–69B. Respectively coupled to the junctions between the gas block valves and their corresponding check valves are solenoid-actuated bleed valves 70A–74A and 70B–74B, the bleed valves being respectively coupled to atmosphere through check valves 75A–79A and 75B–79B. The gas block valves cooperate with their series-connected check valves to prevent gas flow in either direction, when not desired. The bleed valves permit venting of any leakage, should it occur, while the series-connected check valves ensure that air or contaminants are not permitted to enter the system. The carbon dioxide conduit 40 is also coupled to its associated pump 45 through a solenoid-actuated back pressure valve 80, connected in parallel with a solenoid-actuated pump recycle valve 81, in a known manner.

The check valves 65A through 69A are all connected to the manifold 35A via two parallel paths, one through a full-flow, solenoid-actuated valve 82, and the other through a solenoid-actuated, restricted-flow valve 83A connected in series with a manual valve 84A. Similarly, all of the check valves 65B–69B are connected to the manifold 35B through two parallel paths, one through a solenoid-actuated, full-flow valve 82B and the other through a solenoid-actuated, restricted-flow valve 83B connected in series with a manual valve 84B.

Figure 3:
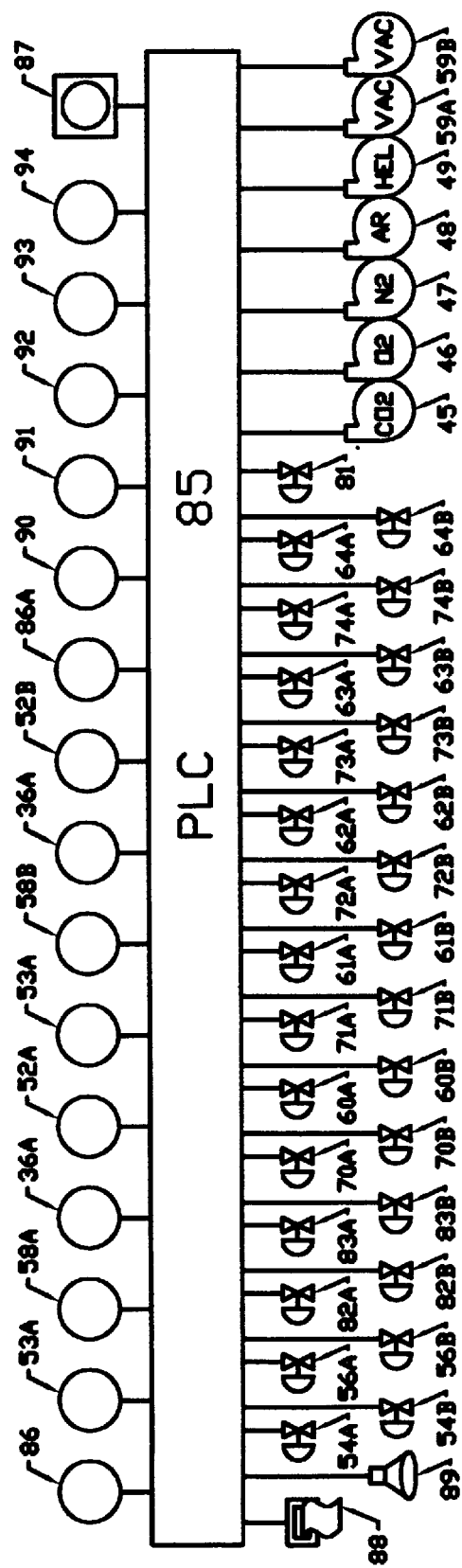
FIG. 3 is an electrical diagram of the cylinder-filling system and controller of the present invention.

Referring to FIG. 3, the controller 50 includes a processor 85, preferably in the form of a programmable logic controller, which controls the valves and pumps in accordance with information from the transducers, stored information and information supplied by the operator via a user interface. The processor 85 has electrical inputs coupled to the temperature transducers 36A and 36B, the scales 52A and 52B and the pressure transducers 53A, 53B, 58A, and 58B, as well as inputs from an instrument error switch 86 and an emergency stop switch 86A. The processor 85 has electrical outputs coupled to the gas pumps 45–49, the solenoid-actuated valves 54A, 54B, 56A, 56B, 60A–64A, 60B–64B, 70A–74A, 70B–70B, 80, and 81, the vacuum pumps 59A and 59B, a printer 88 and an annunciator 89, which may be in the form of an audible alarm device. The processor 85 also has electrical inputs from and outputs to a user interface, which is preferably in the form of a touch-screen graphic monitor 87, which may be of the type made by Mitsubishi under model no. A800GOT. It will be appreciated that other user interface devices could also be coupled to the processor 85, such as a keyboard, mouse, voice-to-digital converter or the like.

Preferably, the solenoid-actuated valves are opened and closed pneumatically by a source of compressed air (not shown). Each such valve may be of the type sold by CPV Manufacturing, Inc. under the trademark FLOWMASTER.

In brief, during a typical filling operation, after the product cylinders 31A, 31B have been coupled to manifolds 35A, 35B, the manual valves 32A, 32B, 34A, 34B are opened. Then the vent valves 54A, 54B are opened to bleed or vent any gas in the product cylinders or the reference cylinders 51A, 51B to atmosphere. Then the product cylinders, reference cylinders and manifolds are evacuated using the vacuum pumps 59A, 59B, to a predetermined vacuum level, after which the cylinders may be purged. A purging cycle begins by filling the cylinders with a selected gas from one of the sources to a selected low pressure, e.g., 100 psi. This purging is effected by closing the bleed valve of the selected purge gas, then opening the gas block valve associated with the selected purge gas and finally opening the restricted-flow valve 83A, or 83B to allow gas to flow into the cylinders to the desired purge pressure. The cylinders are then again vented and evacuated. The operator can select any number of such purging cycles, using any of the available gases.

Upon completion of the vent, vacuum and purge cycles the bleed valve for the first gas to be added is closed and the associated gas block valve is opened. After a predetermined time the restricted-flow fill valve and, if all criteria are met, the full-flow valve, are opened and product flows into the cylinders. The target weight for the gas is calculated from the saved formulas, and the actual weight of the gas in the reference cylinder, as measured by the scale, is compared to the target weight. If the flow of gas, as measured by weight change per unit time, drops below a predetermined but adjustable rate, the product supply pump is started to increase the flow rate. The filling continues until the actual gas weight reaches a predetermined and adjustable point short of the target weight. At this point the full flow valve closes and the flow rate is reduced to allow a more controlled flow while approaching the target weight. Once the actual weight is equal to the target weight the fill pump is stopped. After a predetermined time, which is adjustable, the limited flow valve is closed.

At this point a predetermined but adjustable timer is started called the "Settle Timer," which allows the thermodynamics of the system to reach equilibrium or become static. At the end of the settle time the variation between the actual weight and the target weight is compared to a predetermined but adjustable variance table based on the percentage ratio of the component being added to the total gas of the cylinder. If the actual weight is within tolerance limits the product supply valve is closed and, after a predetermined but adjustable time, the product bleed valve is closed. Whether or not the actual weight settles to within the tolerance limits, the variance between the actual weight and the target weight is noted and a predetermined, but adjustable fraction of that variance is calculated and added to the target weight as an error compensation value. If more than one gas is to be added the sequence begins again for the next gas, and so on.

The processor 85 executes a stored program routine which controls the operation of the controller 50. In this regard, it will be appreciated that suitable storage media (not shown) are associated with the processor 85. The routine is essentially menu-driven and generates a plurality of display screens which are displayed on the monitor 87 for guiding the operator in setup and operation of the system, reporting on progress and status of the system during operation, and generating production reports in connection with a filling operation. Referring now to FIGS. 4–21, details of the touch screen displays and the operator's interaction therewith will be described.

Figure 4:
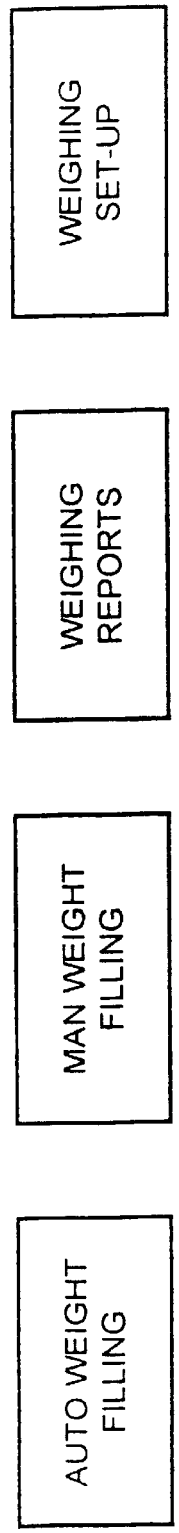

FIG. 4 depicts the main screen with four rectangular boxes, respectively bearing the legends indicated. After the controller 50 has been coupled to the filling system 30, in the manner illustrated in FIG. 1, the "Weighing Set-Up" box is touched, which brings up the screen depicted in FIG. 8, which bears six boxes bearing the legends indicated. A drop box keypad 90 (FIG. 8A) will appear to enable the operator to enter his pass code, as at 91, which will allow the operator access to the various set-up screens.

Then the "Set Points" box is touched, causing the "System Set Points" screen to appear. This is a two-page screen, the first page of which is illustrated in FIG. 12, and the second of which is shown in FIG. 13. The operator can move from one page to another by pressing the word "NEXT" on either page. The screen has an upper section, which allows set point entry of ten parameter values which are common to both manifolds. The screen also has a lower section with one column to the left, labeled "Manifold No-1" and a second column to the right, labeled "Manifold No-2." Each side of the lower section has the same eight lines, which are independent for each manifold. Each line item description in both upper and lower sections is followed by an adjacent area 92 for numerical values. The keypad drop box 90 (not shown—see FIG. 8A), which allows entry of the numbers for each set point, will appear when the value area 92 to be edited is touched. Then, the number to place into that area is created by touching the number "Keys," followed by "ENTER," in the drop box 90.

The "High Pressure Alarm" is the pressure in PSIG (pounds per square inch gauge) in Manifolds 1 and 2 (35A, 35B) above which visual and audible alarms will be set off, the valves will be closed or opened and the pumps will be turned off to pause the system in a safe manner. The operator enters the pressure, which is not expected to be reached under normal operating conditions.

The "High Temp Alarm" is the cylinder temperature at which visual and audible alarms will be set off, the valves will be closed or opened and the pumps will be turned off to pause the system in a safe manner. The operator enters a cylinder temperature, which is not expected to be reached under normal operating conditions.

The area next to "Vacuum Set Point" is filled in with the goal pressure during the evacuating step, as measured by vacuum transducers 58A and 58B, in inches of mercury. The greater the number in inches of mercury (i.e., inches below atmospheric), the less the quantity of extraneous gases in the cylinders, but, on the other hand, the more time it takes, exponentially, to achieve.

The box next to "Vent Set Point" is filled with the goal pressure in PSIG, as measured by transducers 53A and 53B, during the venting step. The less the pressure, the less the quantity of extraneous gases in the cylinders, but on the other hand the more time it takes exponentially to achieve. As will be explained, after the vent pressure reaches the selected set point, there will be a selected time during which vent valves 54A and 54B stay open to accommodate further venting. The desire is to have the pressure after the ensuing time-out period to be as close to zero (atmospheric) as possible in order to avoid damage to vacuum pumps 59A and 59B when they are turned on.

The area next to "Purge Set Point" is filled in with the goal pressure during the purging step, as measured by transducers 53A and 53B in pounds per square inch gauge. The greater the number in PSIG, the greater the quantity of gas that is put in the cylinders, but, on the other hand, the more diluted any contaminants in the cylinders become, with the desired result being a higher purity of product. The less the pressure, the less the quantity of gas used in the cylinders, but on the other hand, the higher the chance of trace contaminants being left in the cylinders.

The area next to "Flow Increase Per 10-Sec" is filled in with the number of grams added per 10 seconds corresponding to the least rate of flow acceptable without the appropriate one of the gas pumps 45–49 running. This weight increase is as measured by scales 52A and 52B in grams in the associated reference cylinders 51A and 51B. The lower the number of grams, the slower the fill rate that will be permitted without turning on the gas pumps but, on the other hand, the more accurately the unit will be able to stop at the correct weight with the desired result being a more accurate gas mixture.

The area next to "CO2 Full Flow Open" is filled in with the pressure in PSIG at which the carbon dioxide pump 45 will start. This is used to allow some back pressure to form in the cylinders and reduce the amount of $CO_2$ that will solidify. If the cylinder pressure is below this point the gas pump 45 will not run.

The area next to "Close Full Flow Early" is filled in with the number of grams that represents the difference between the target weight and the weight at which the full-flow valves 82A and 82B close, leaving only the restricted-flow valves 83A and 83B open. The product weight is measured by scales 52A and 52B in grams in the associated reference cylinders 51A and 51B. The lower the number of grams entered here, the closer to the target weight the product weight will get before the fill flow rate will be slowed down, and the faster the cylinders will fill, but with less accuracy. The higher the gram number entered, the sooner the flow rate will be slowed, and the longer time the system will have to stop at the correct weight, with the result being a more accurate gas mixture.

The area next to "Man-1 Correction Rate" is the number by which the variance between the target weight and the actual weight after the settle time (discussed below) is divided. The resulting dividend is then added to the existing adjusted target weight to correct it. For example, if the correction rate number is 10, the variance between target and settle weights would be divided by 10, meaning that 10% of the variance would be added to the target weight as a correction factor. The higher the value the smaller the correction and the less effect each error correction has. This means that it will take more fill cycles for the system to become accurate. The lower the number the faster the system will become accurate. However, if some unintentional error happens, such as a leaky product cylinder, and the actual weight after settling is very low, then the fast correction amount may result in overfilling of the next batch of cylinders, which do not have the same error.

The area next to "Man-2 Correction Rate" does the same thing as the area for "Man-1 Correction Rate". The manifolds have different rates, since their sizes and associated process piping may be different and affect the settle weights differently.

In the lower section of the screen, the area next to "Press Transducer" is used to adjust the pressure transducer range. The operator enters the upper limit, in PSIG, of the pressure transducer range of linearity, as indicated in the spec sheet for transducers 53A and 53B. It is assumed that the lower limit of the transducer range is 0 PSIG. The operator can enter settings corresponding to the particular components of the controller 50. If any of those components become inoperative and need to be replaced, the operator can readily enter data corresponding to the new and/or changed components.

The area next to "Vac. Transducer" is used to adjust the vacuum pressure transducer range. The operator enters the lower limit, in "Hg" (inches of mercury), of the pressure transducer range of linearity as indicated in the spec sheet for transducers 58A and 58B. It is assumed that the upper limit of the transducer's range is 0 PSIG.

The area next to "Temperature" is used to adjust the temperature transducer range. The operator enters the upper limit, in degrees Fahrenheit, of the temperature transducer range of linearity, as indicated in the spec sheet for transducers 36A and 36B. It is assumed that the lower limit of the transducer's range is 0 degrees F.

The box 94 normally appears green and states "Comp Active." It is used to engage the system's self-compensation or error-averaging sub-routine. If the operator wishes to adjust the fill weights on his own, or is filling some non-standard cylinders and does not wish the results used in the averaging routine, then the box 94 can be touched and the color will change to red and the associated legend changes to "Comp Inactive," as illustrated.

The area next to "CO2 F-FLOW IF>THAN" in FIG. 13 is used to adjust a weight in grams, which will be compared to the target weight in the formula for the carbon dioxide which is being added, to determine whether or not the full-flow value 82A or 82B should be used during filling. If the target weight is higher than the entered value, both the full-flow valve 82A, 82B and the restricted-flow valve 83A, 83B will open. The full-flow valve will still close in advance of the target weight based on the previous entry in the "Close Full Flow Valve Early" box. If the target weight is less than the value in the "CO2 F-FLOW IF>THAN" area, then the full-flow valve 82A, 82B will not open and filling will be accomplished solely through the restricted-flow valve.

The areas next to the other parameter descriptions in FIG. 13 serve the same purpose for the other gases.

Figure 8:
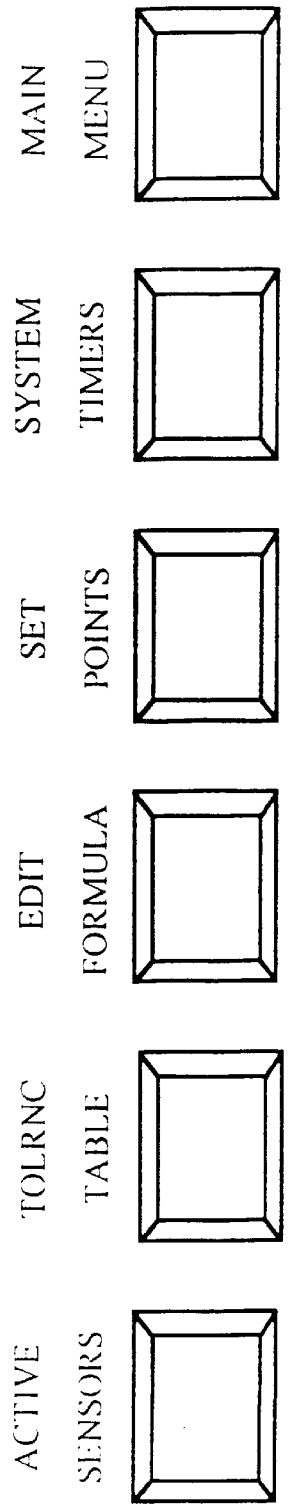
Figure 8A:
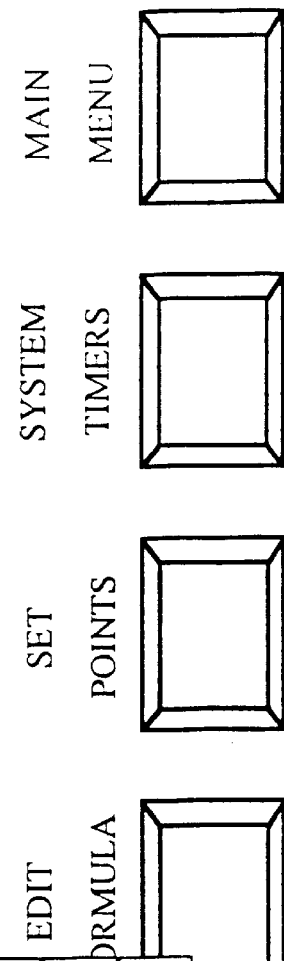

After all the applicable system set points have been entered, the operator returns to the screen of FIG. 8 by pressing the word "MENU" in the display of either FIG. 12 or FIG. 13. The operator then touches the "System Timers" box, causing the system timers screen to appear. This is also a two-page screen, the pages of which are respectively illustrated in FIGS. 10 and 11. The purpose of this screen is to enter predetermined system delay times in connection with the actuation of the various pumps and valves of the system. The purpose of these delays is, fundamentally, to assure that one operation is completed before the next begins since, while the electrical control signals are substantially instantaneous, the physical response of the valves and pumps may take a substantial finite time which, in some cases, exceeds a second. The screen lists 19 time delays, 15 of which permit entry of separate delay times for each of the manifolds, and four of which (those with entries in only the "Manifold #1" column) are common to all manifolds. When the operator wishes to edit a delay time, he touches the area 95 for the numerical value, whereupon the drop box keypad 90 (not shown—see FIG. 8) appears to permit entry of the selected value. The values are entered by the operator based upon his knowledge of cycling delays, experience and trial and error.

The "Vent Open Delay After Set Point" is the delay in seconds after a start instruction when the vent valve 54A or 54B opens. The "Vent Close After Set Point" time is the time after a predetermined pressure is detected by the pressure transducer 53A or 53B, when the vent valve 54A or 54B closes, which predetermined pressure was set as the "Vent Set Point" value in the screen of FIG. 12. The "Vacuum Pump Start Delay" is the time after the vent valve 54A or 54B closes, when the vacuum pump 59A or 59B is turned on. The "Vacuum Valve Open Delay" is the time after the vacuum pump 59A or 59B turns on, when the vacuum valve 56A or 56B, as well as the full-flow valve 82A or 82B and the restricted-flow valve 83A or 83B, are opened. The vacuum valve and the full-flow and restricted-flow valves are closed a predetermined fixed time after a predetermined vacuum pressure is detected by the pressure transducer 58A or 58B, this predetermined pressure having been set as the "Vacuum Set point" value in the screen of FIG. 12. The "Vacuum Pump Stop Delay" is the time after closure of the vacuum valve 56A or 56B, when the vacuum pump 59A or 59B is turned off. The predetermined vacuum set point pressure must be maintained for a time period entered as the "Vacuum Set Point Hold," in order to allow the system to continue to the next cycle.

If a purge cycle is called for, the "Delay Reading Purge Pressure" value is the time after the selected gas pump has started when the pressure transducer output is read. The "Purge at Pressure Delay" is the time after the "Purge Set Point" (FIG. 12) pressure is reached that the system waits before venting.

The "Gas Valve Open Delay" is the time after the selected bleed valve is closed, when the full-flow valve 82A or 82B (if required) and the restricted-flow valve 83A or 83B and the selected one of the gas block valves 60A–64A or 60B–64B are opened. The "Bleed Valve Close Delay" is the time after the vacuum pump 59 or 59A is turned off, when the corresponding bleed valve 70A–74A or 70B–74B is closed. The "Gas Pump Start Delay" is the time after it is determined that the gas pump is needed when the associated one of the gas pumps 45–49 is turned on.

The full-flow valve 82A or 82B is closed (assuming it was required to open during a fill cycle) in response to a predetermined, but adjustable, weight in advance of the target weight, this predetermined weight having been set as the "Close Full-Flow Early" weight in the screen of FIG. 12. Continued filling is through only the restricted-flow valve.

The operative one of the gas pumps 45–49 is turned off in response to the actual weight in the reference cylinder 51A or 51B, as measured by the scale 52A or 52B, equaling the target weight for that gas, which was calculated in accordance with a predetermined formula, as will be described more fully below. The "Slow-Flow Valve Close Delay" is the time after the selected gas pump is turned off when the restricted-flow valve 83A or 83B closes. If the closure of the restricted-flow valve is at the end of a fill cycle, the system is then allowed to settle for an "At Weight Settle Time" set in the screen of FIG. 10. The "Gas Valve Close Delay" is the time after the settle timer times out when the selected one of the gas block valves 60A–64A, 60B–64B is closed. During this delay the system checks to see if the weight of the selected gas loaded into the reference cylinder is within a tolerance value of the target weight, which tolerance level is set in a manner to be described below. If not, the gas block supply valve is not closed and, instead, the fill cycle is resumed. The "Bleed Valve Open Delay" is the time after the selected gas block valve is closed, when the corresponding bleed valve is reopened.

After all of the system timers have been entered by the operator in the screen of FIGS. 10 and 11, the operator returns to the screen of FIG. 8 by touching "MENU" on either of the FIG. 10 or FIG. 11 displays.

At the screen of FIG. 8, the operator touches the "Tolrnc Table" box to cause the screen of FIG. 16 to appear, enabling him to set the gas mixture tolerances. The "Gas Tolerance Table" enables the operator to enter the gas mixture percentage ranges and their respective acceptable blend tolerances. The table also allows the operator to enter different acceptable blend tolerances for the same range but for different grades of gas mixtures. Thus, in the illustrated example, if a gas component represents from 0 to 5% of a mixture, the tolerances for industrial gas, medical gas and special gas may, e.g., respectively, be 5%, 5% and 2%. However, for a gas which represents between 50% and 100% of the mixture, the tolerances may all be 2%.

The operator then touches the "RETURN" box on the screen of FIG. 16 to return to the screen of FIG. 8, and then touches the "Active Sensors" box, which causes the screen FIG. 14 to appear. This "Sensor Select" screen allows the operator to view the sensor output signals for troubleshooting reasons and also to deactivate a sensor if it is malfunctioning. The de-activation of a sensor is accomplished by touching the box (normally green) associated with the sensor in question. Once touched, the box, which contains the name of the sensor and that it is "Active" changes to red and displays "Inactive," as illustrated. This is only done to allow for emergency use of the system in manual mode.

The operator returns to the screen of FIG. 8 and touches the "Edit Formula" box, causing the screen of FIG. 15 to appear. It is this screen which enables the operator to enter new formulas, adjust existing formulas or view the correction factors being used. The operator begins the process by selecting the gas category for the new or existing formula that is to be entered or modified. This is accomplished by touching one of the four boxes "Indus.Gas-A", "Indus.Gas-B", "Medical Gas" or "Spec.Gas". Touching a box causes a "Formula Select To Edit" screen for the gas category selected to appear (FIG. 9). For each gas category the system can store 25 formulas.

From these screens the operator selects the formula to edit or a blank line to add a formula into. The operator selects a formula by touching a particular box on the grid of FIG. 9, as at 99, whereupon the system switches back to the "Formula Editor" screen of FIG. 15. The operator next touches the area next to "Cyl. Fill PSIG" box, which displays a drop box 100 (FIG. 15A) with the various fill pressure options for the selected formula. The operator touches the selected one to enter it. Next a drop box keypad 90 (not shown—see FIG. 8) appears and the operator enters the percentage of each component of the mixture as a percentage. In the illustrated example, formula no. 01 is for a two-gas mixture, including 2% carbon dioxide and 98% argon. The total percentages must equal 100. Next, the operator enters in the "ORD" line the order in which he would like the gases added, in this case carbon dioxide first and then argon. Once this is complete he touches the "Cal." box, which causes the program to calculate the gram adds for each component, as well as calculate the maximum fill pressure if one of the gases selected is condensable. The system displays the weight calculations for the operator to review at line 101. If the operator is satisfied with the calculations he presses the "Writing" box, which stores the calculations. The operator has the option of entering his own calculations, as at 101a, if he wishes.

Thus, it will be appreciated that the operator moves back and forth between the screens of FIGS. 9 and 15, entering or editing selected formulas in the screen of FIG. 9 and then returning to FIG. 15 to enter the proportions, and order of filling and calculate the add weights. It will be appreciated that, once a group of formulas has been stored, the formula editing process will be an infrequent event.

As was mentioned above, and will be explained more fully below, in use the system will automatically calculate correction factors for the fill weights. In use, the M1 and M2 lines, respectively, will display for the two manifolds, the current correction factor being used for each gas in the filling of that gas, as a result of application in previous fill cycles of the correction rate value which was set in the screen of FIG. 12. Next to the legend "TOTAL %" the screen will display a running total of the percentages of the various gases in the mixture as they are entered in the "%" line, so that the operator can readily see whether they total 100%.

The system now having been initially set up, the operator returns to the "Weighing System Operating Parameters" screen of FIG. 8 and touches the "Main Menu" box, which causes the "Main Menu" screen of FIG. 4 to appear. Touching the "Auto Weight Filling" box causes the screen of FIG. 5 to appear. The left and right halves of this screen respectively schematically depict system sections 30A and 30B. The oval icons correspond to vacuum pumps 59A, 59B, the rectangular icons represent the gas pumps 45–49, the bowtie-shaped icons represent valves, the unlabeled ones being the gas block valves 60A–64A and 60B–64B, and the cylinder-shaped icons represent the reference cylinders 51A and 51B.

Each valve icon will appear green when the corresponding valve is "Open," and whenever the corresponding valve is closed the valve icon will appear red. For each gas pump the word "Running" (not shown) will appear below the corresponding pump icon when the pump is on. Inside each gas pump icon is displayed the percentage of that gas that the current mixture is to include. Just above the pump icon, as at 103, is displayed the place in the add sequence in which that gas is to be added. Just below each reference cylinder icon is displayed the number of the mixture that is being filled on that manifold.

Across the top of each half of the screen, is an information bar that displays all of the pertinent information that the operator should have access to during the filling operation. The "S/TM" box represents the settle timer. The settle time is the "At Weight Settle Time" that was entered in the "System Timer" screen of FIGS. 10 and 11 during set up.

The box displays the elapsed time in seconds as the timer times out. This timer starts as soon as the target weight for each gas of the mixture has been added. The "VAC" box displays the vacuum reading from pressure transducer 58A or 58B in inches of mercury. The "TMP" box displays the temperature reading in degrees Fahrenheit from temperature sensor 36A or 36B, which represents the temperature of the product cylinders being filled. The "PSIG" box displays the pressure reading in pounds per square inch gauge from pressure transducer 53A or 53B and represents the pressure in the product cylinders being filled. The "TARGET" box displays the target weight in grams for the gas component being added, as taken from the formula of the gas or gas mixture being made, as calculated in the screen of FIG. 15. The "SCALE" box displays the actual weight in grams of the gas component currently being added which has so far been added into the reference cylinder, as measured by the scale 52A or 52B.

Before running the software to automatically fill the cylinders, preliminary steps are performed. The first step is for the operator to touch the "CYL CATEG" or cylinder category box. This action causes the drop box 104 (FIG. 5A) to be displayed containing sections respectively labeled "Ind-A", "Ind-B" "Med." and "S.G." corresponding to special gases. The operator touches the appropriate section, depending on what grade of product is to be filled and where the gas or gas mixture formula is stored. Once the operator selects the gas category the "Formula Select To Edit" screen of FIG. 9 for the category selected appears. From this screen the operator selects the preentered formula from the list by touching "ENTER" for that formula, which then switches to "ACTIVE". Once the selection has been made the screen reverts back to the "Auto-Mode" of screen FIG. 5. The "Auto-Mode" screen now displays the "Mix #" of the formula selected as at 105, and it also displays in the gas pump icons the percentage of each component in the formula to be added, as well as the addition order of the components at 103. The "CYL CATAG" box has now changed color, indicating that this step is complete.

The next step for the operator to perform is the cylinder pre-fill inspection, and acknowledge to the system that the inspection is complete. To accomplish this the operator touches the "CYL P/FIL" box. If the gas type selected was "Industrial" or "S.G." type, the operator touches the "Cyl P/Fill" box after he has made the inspection, causing that box to change colors and acknowledges that the task is complete. If the operator selected a "Medical" formula, another drop box (not shown) with six sections appears. The text in the sections are based on FDA requirements. The first section of the drop box requires the operator to inspect the test date and the pressure marking on each of the cylinders. After he does so, he touches that section box to acknowledge that the step is complete. He would perform the rest of the instructions in sequence and acknowledge that they have been completed by touching the corresponding sections of the drop box. Most of the instructions are self-explanatory. The "Hammer Test" requires the operator to strike the cylinder. The absence of a particular ringing sound means that it contains liquid or is rusted or its integrity has been compromised. Once all of the pre-fill steps have been complete the "Cyl P/Fill" box would change colors indicating the step is complete.

The next step for the operator to complete is to determine if the cylinders being filled need to be purged. If the operator determines that purging is required he touches the "PURGE ON" box. A drop box (not shown) appears, which contains options for one, two, three or four purges. The operator makes a selection by touching the box with the corresponding number of purges in it. Once the number of purges has been selected the next drop box (not shown) appears, which gives the operator an option of which gas the operator would like the cylinders purged with. The operator touches the desired gas and the purge step is complete and again the "PURGE ON" box changes color.

When the purge selection step is complete, or if the operator determines that no purge is required, the operator next moves on to the "RECORD" box. By touching that box the "PRODUCTION DATA" screen of FIG. 17 will appear. This screen allows the operator to enter the number, size designator and volume of the cylinders he is filling. The screen can hold 10 different size cylinders for each gas mixture. The screen also stores the total volume of each size of cylinder that is to be filled. The operator enters the quantities by touching the area in the "QTY" column adjacent to the size of cylinder that is being filled. A numeric keypad drop box (not shown) appears, which allows the operator to enter the quantity. If the size being filled is new the operator would pick a blank line and enter the quantity as described above. Next he would touch the space adjacent to the quantity under the "SIZE" column and select the alpha or numeric drop box and enter the size. Finally the operator would select the space under the "CYL/VOL" column and enter the actual volume in cubic feet of compressed gas each cylinder holds. The "Total Qty" column displays the total volume of all cylinders of the particular size, i.e., the product of the "Qty" column and "Cyl. Vol" column. The system is designed to allow the operator to review his entries. If they are correct he press the calculate "CAL" box, which stores the information for the current quantity. If the cylinders being filled were a new size the operator would also press the "SAVE" box, which would store the "SIZE" and "CYL/VOL" information permanently. Once these steps have been completed the operator presses the "AUTO" box which returns him to the "AUTO MODE" screen FIG. 5. The "RECORD" box has also now changed color to confirm that this step has been completed.

Automatic Operation

Referring now also to FIGS. 22A–22F, the operation of the controller 50 during an automatic filling operation will be described with the reference to the flow chart of the program software by which the processor 85 operates. Depicted are those aspects of the software which are pertinent to the details of the system described above. The flow chart is divided into five sections, respectively entitled "Vent Cycle," "Vacuum Cycle," "Purge Cycle," "Fill Cycle," and "Finish Cycle."

Figure 5:
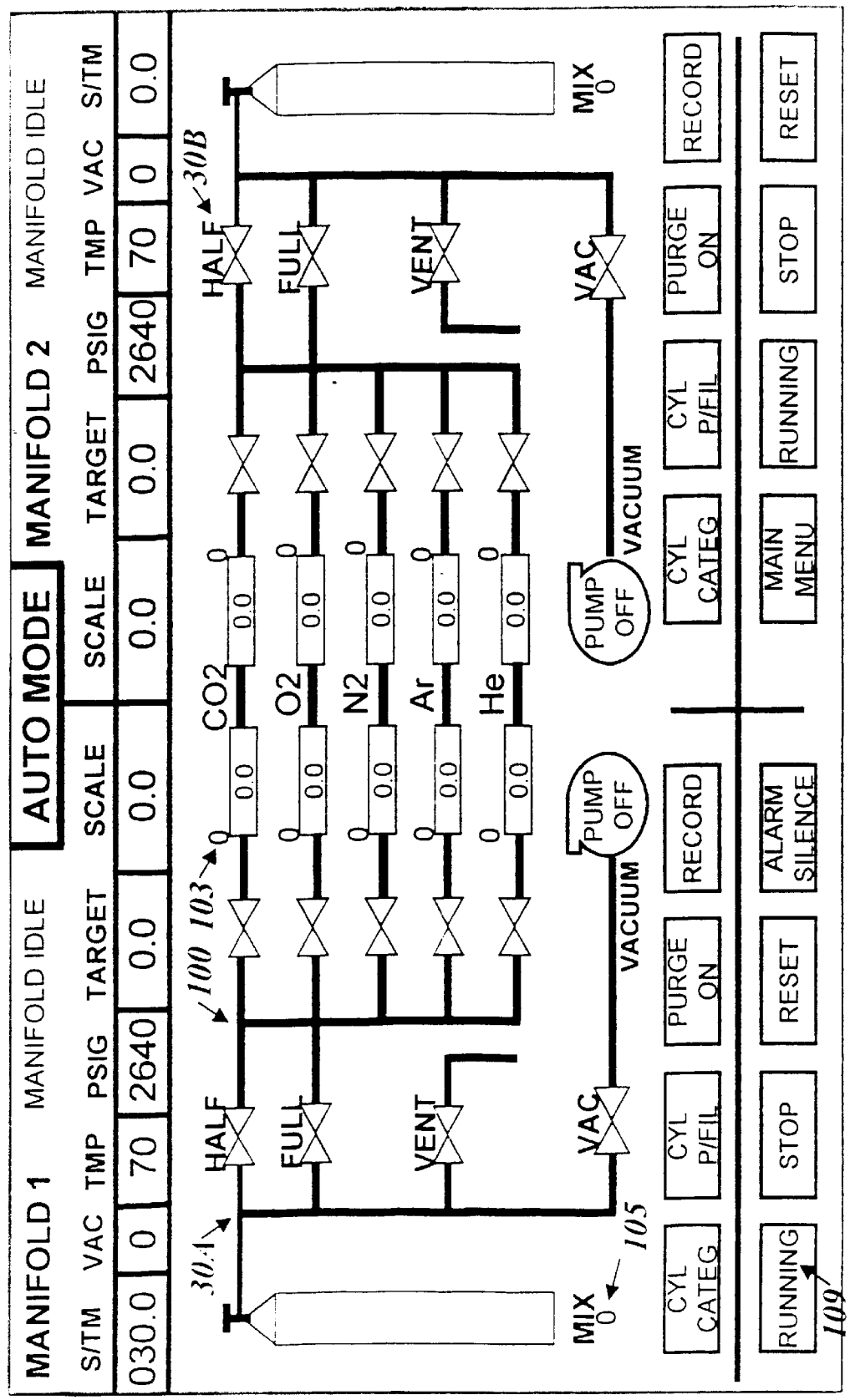
Figure 5A:
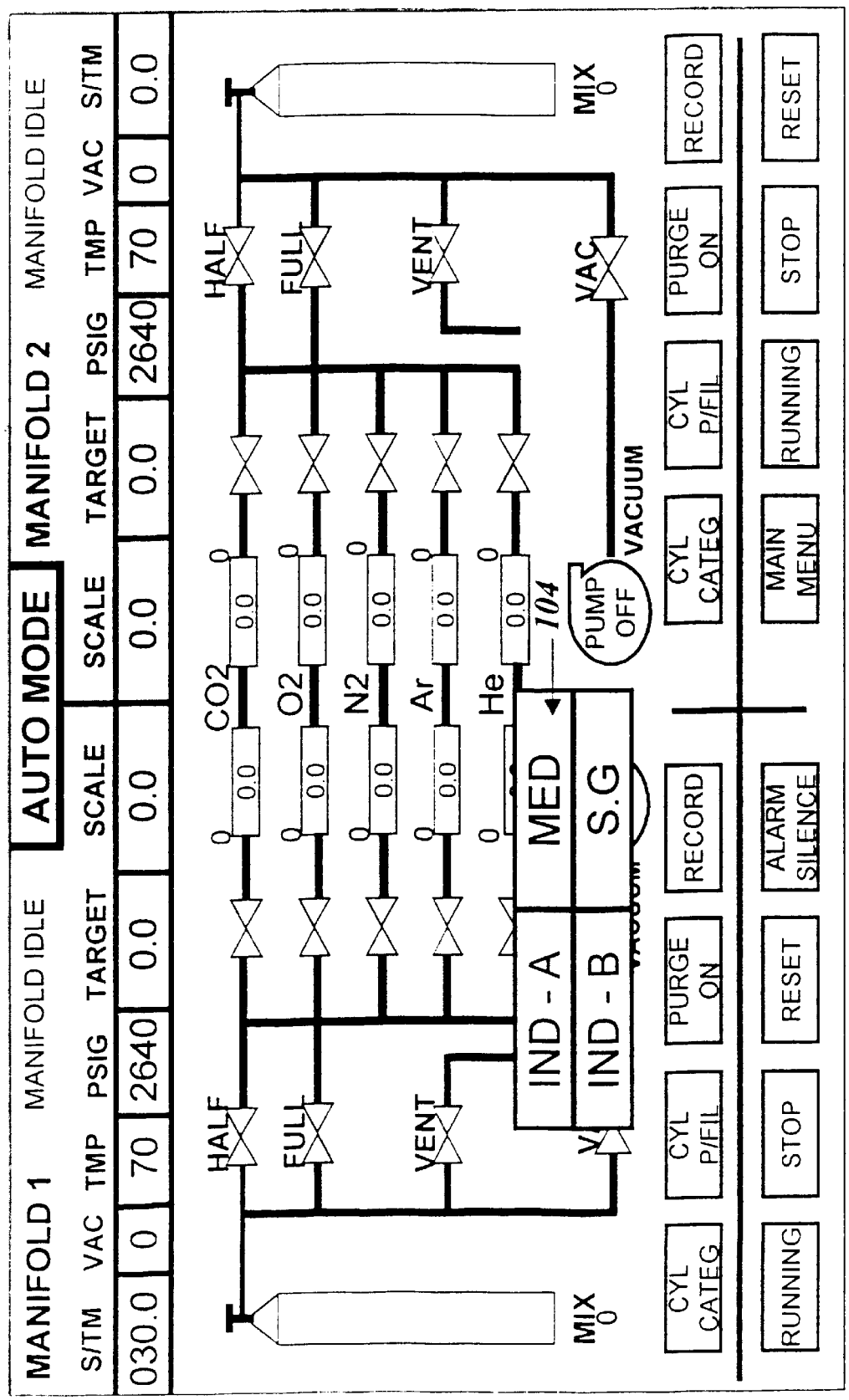

After selecting basic parameters in the screens of FIGS. 4–21 and selecting parameters corresponding to "Gas Type," "Cyl Pre-Fill," "Purge Off" and "Report" on the screen of FIG. 5, and opening the manual valves 32A, 32B, 34A, 34B, the "Start/Running" box 109 is touched. This starts the auto fill cycle. The box 190 changes from light blue to green and the normal "START" legend changes to "RUNNING", as illustrated. The system will now automatically perform the filling operation and, as it does so, the pump and valve icons on the screen will change color accordingly, a valve icon being green when the corresponding valve is open and red when it is closed, and a pump icon having the word "Running" appear thereunder when the pump is operating. As the gases are added to the cylinders, the reference cylinder icons will fill in accordingly and the data across the top of the screen will change accordingly.

Initially, at 120 (FIG. 22A), the routine waits the "Vent Open Delay" time (FIG. 10). At 121, the routine inquires whether the valve control air is operating normally. As explained above, all of the valves are operated by air. If the air supply is disrupted, for example, the answer is "no" and an audible and/or visual alarm is created and the cycle is discontinued at 122. Otherwise, the routine inquires at 123 whether the pressure transducer 53A or 53B is operating normally. If the answer is "no", an alarm is produced and further processing is discontinued at 122.

If the transducers are operating properly, the routine then, at 124 opens the full-flow valve 82A or 82B, the restricted-flow valve 83A or 83B and the vent valve 54A or 54B and the corresponding icons on FIG. 5 turn green. Then, at 125, the routine checks to see if the pressure indicated by the pressure transducers 53A or 53B is greater than the Vent Set Point pressure set in FIG. 12. The routine continues to monitor the pressure transducer until the pressure has dropped to the vent set point and then, at 126, waits the Vent Close After Set Point delay time of FIG. 10 and then, at 127 closes the full-flow, restricted-flow and vent valves, changing their icons to red in FIG. 5. The routine then checks at 129 to see if the vacuum pump is in use. (This decision is necessary only with the embodiment of FIG. 2, which uses only a single vacuum pump.) If not, the routine, at 130, checks to see if the vacuum pressure transducer 58A, 58B is operating normally. If not, an alarm is signalled and the auto cycle is stopped at 131, otherwise the routine progresses to the vacuum cycle on FIG. 22B.

In the vacuum cycle, the routine first, at 140, waits the Vacuum Pump Start Delay time set in FIG. 10 and then the vacuum pump 59A, 59B is started at 141, turning its icon to green. Simultaneously the "VAC" box in FIG. 5 displaying the cylinder pressure from pressure transducer 58A or 58B starts to drop. Then, at 142, the routine waits the Vacuum Valve Open Delay time and then, at 143, opens the full-flow, restricted-flow and vacuum valves, and then waits another pre-set time at 144 before reading the vacuum pressure transducer 58A or 58B. Next, at 145, the routine checks to make sure that the system is drawing a vacuum. It does this by waiting the vacuum the Vacuum No-Flow Alarm Delay (FIG. 11) checking to make sure that the pressure is dropping, and it continues making this check periodically. If a no-flow condition is detected, the system alarms an stops at 146. The routine then checks at 147 to see if the pressure registered via the vacuum pressure transducer 58A, 59B is greater than the vacuum set point (see FIG. 12). The routine continues monitoring the vacuum pressure transducer 58A, 59B until the set point is reached and then, at 148, checks to see if the vacuum set point was reached too quickly, which would suggest that the valve is improperly closed or a conduit is blocked or the like. It does this by checking the time it took to reach the vacuum set point and comparing it to Vacuum Too Short Fill Delay time set in FIG. 10. If the time is too short, the routine alarms and stops at 146. Otherwise, it checks at 149 to make sure that the vacuum set point is held for the Vacuum Set Point Hold time, set in FIG. 10. If it is not, which may suggest a system leak, the routine will stay in the vacuum cycle. Otherwise, the routine, at 150, closes the full-flow, restricted-flow and vacuum valves.

The routine then, at 151, waits the Vacuum Pump Stop Delay time (FIG. 10) before stopping the vacuum pump at 152. The routine then checks at 153 to see if the selected gas pump is in use and, when it is not, checks at 154 to see of the control air is operating normally. If not, it signals an alarm and stops the cycle at 155, otherwise it checks sequentially at 156–158 to see if the scale 52A, 52B, the pressure transducer 53A, 53B and the temperature transducer 36A, 36B are operating normally. If any is not, the routine alarms and stops and 155. Otherwise, it proceeds to the purge cycle of FIG. 22C.

In the purge cycle, the routine first checks at 160 to see if the purge count equals the requested number of purges. If not, this means a purge is required so the routine starts the purge cycle logic at 161 and then, at 162, waits the Bleed Valve Close Delay time (FIG. 11) before closing the selected bleed valve at 163, the latter being indicated by a blue "B/V" appearing adjacent to the corresponding gas block valve icon as at 110. The routine then waits the Gas Valve Open Delay time at 164, opens the selected one of the gas block valves 60A–64A, 60B–64B and the restricted flow valve 83A or 83B at 165 and then, at 166 waits the Delay Reading Purge Pressure time before checking, at 167, to see if gas is flowing at a required minimum rate (the Flow Increase Per 10-Sec rate set in FIG. 12). This test essentially checks to see whether or not it is necessary to turn on the selected gas pump. If the gas is not flowing at the required rate, the routine then waits the Gas Pump Start Delay time at 168 before starting the selected one of gas pumps 45–49 at 169, indicated by the word "RUNNING" flashing beneath the associated pump icon. The routine then checks at 170 to make sure that gas is flowing in each of the manifolds. It does this by waiting the "Man.1&2 Gas No.-Flow Alarm Delay" time set in FIG. 11 and checking to see if there has been a pressure rise. The system repeatedly makes this check and, if it finds there is no flow, alarms and stops at 171. Otherwise, the routine then checks at 171 to see if the pressure registered by the pressure transducer 53A, 53B is greater than the purge set point of FIG. 12. When it is, the selected gas pump is stopped at 173, signified by the word "RUNNING" disappearing, and the routine then, at 174, waits the Gas Valve Close Delay time and then, at 175 closes the selected gas block valve and the restricted-flow valve. If, at 167, the routine had found that the gas was flowing at an adequate rate, it would not start the gas pump and would, instead, immediately skip to 172. If, at 172, the pressure is not yet at the purge set point, the routine returns to 167 and continues retracing this loop until the set point is reached. After the set point has been reached and the gas pump has been stopped and the valves closed, the routine waits the Bleed Valve Open Delay time at 176 before opening the selected bleed valve at 177. The routine then, at 178, waits the Purge at Pressure Delay time then, at 179, adds one to the purge count and then returns to the vent cycle of FIG. 22A at 120 to repeat the vent and vacuum cycles.

Figure 22A:
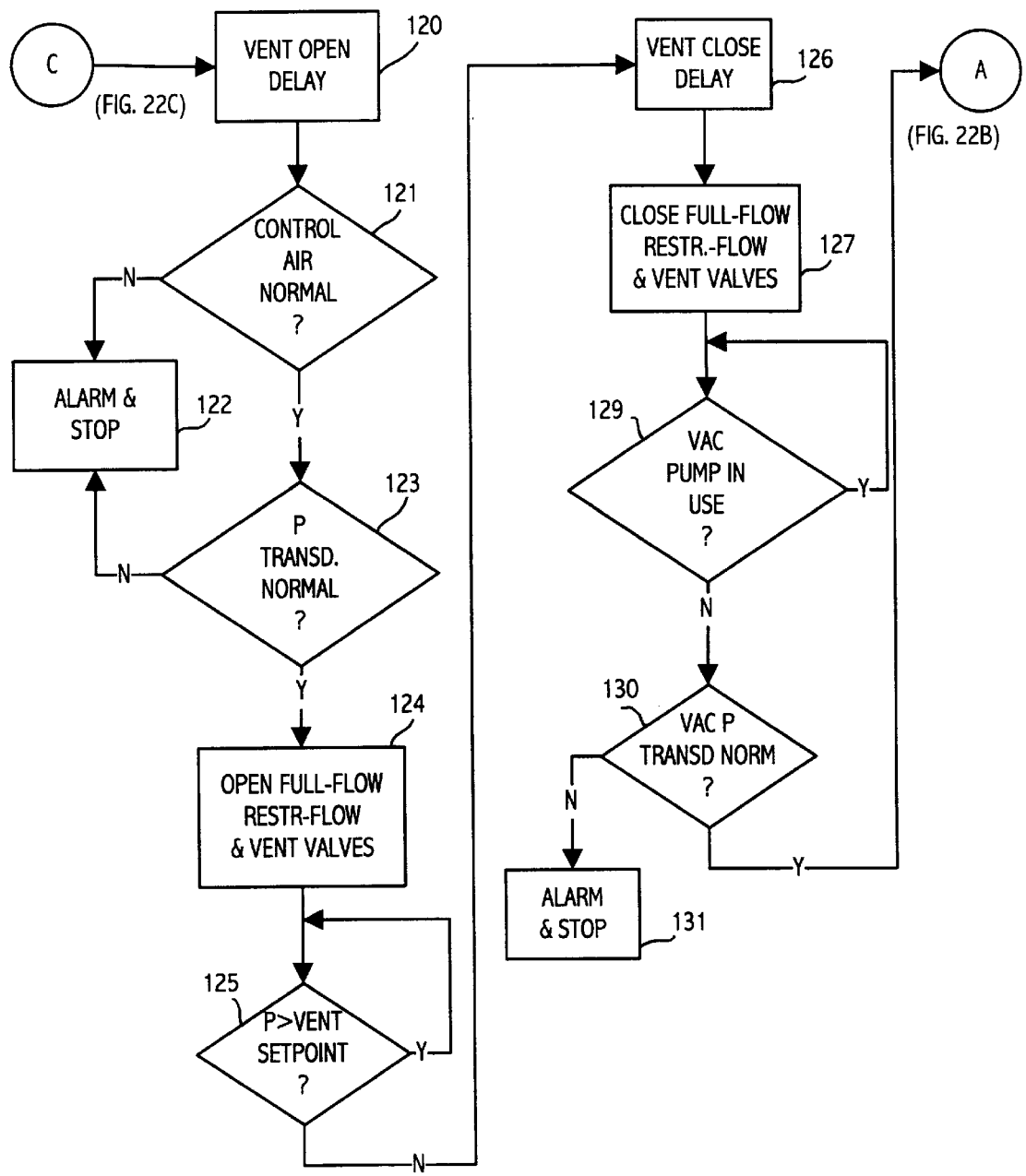
Figure 22B:
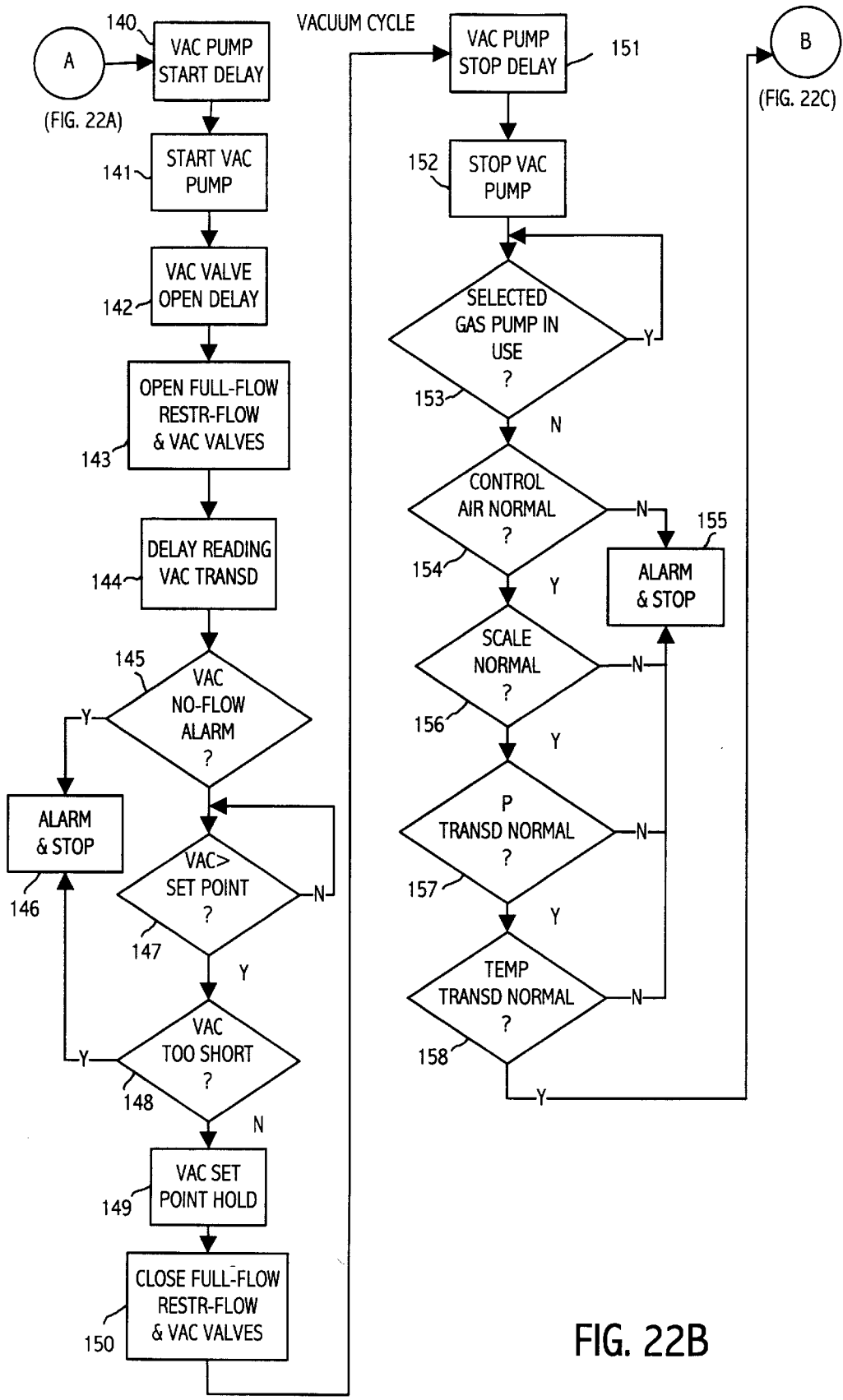
Figure 22C:
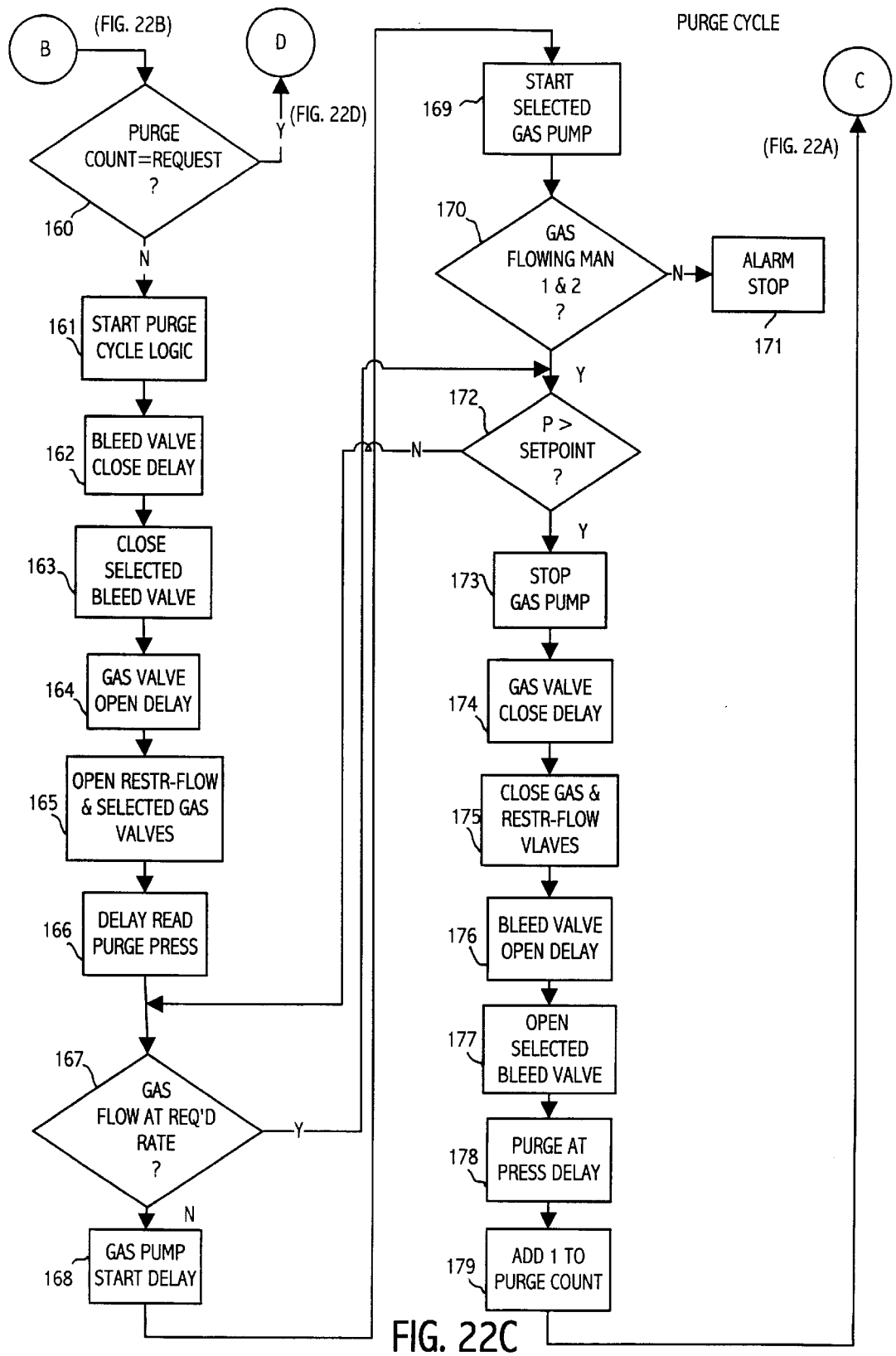
Figure 22D:
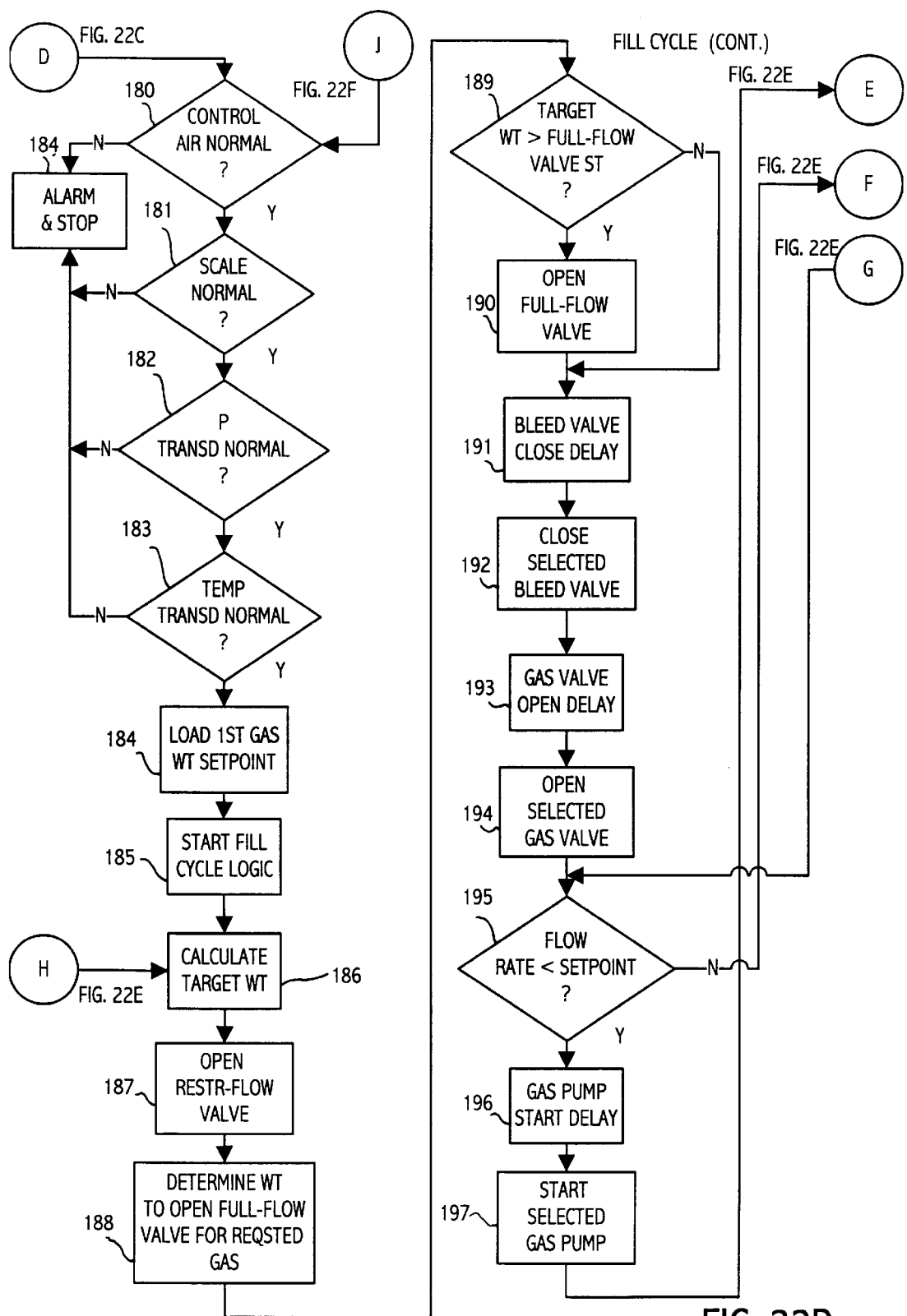
Figure 22F:
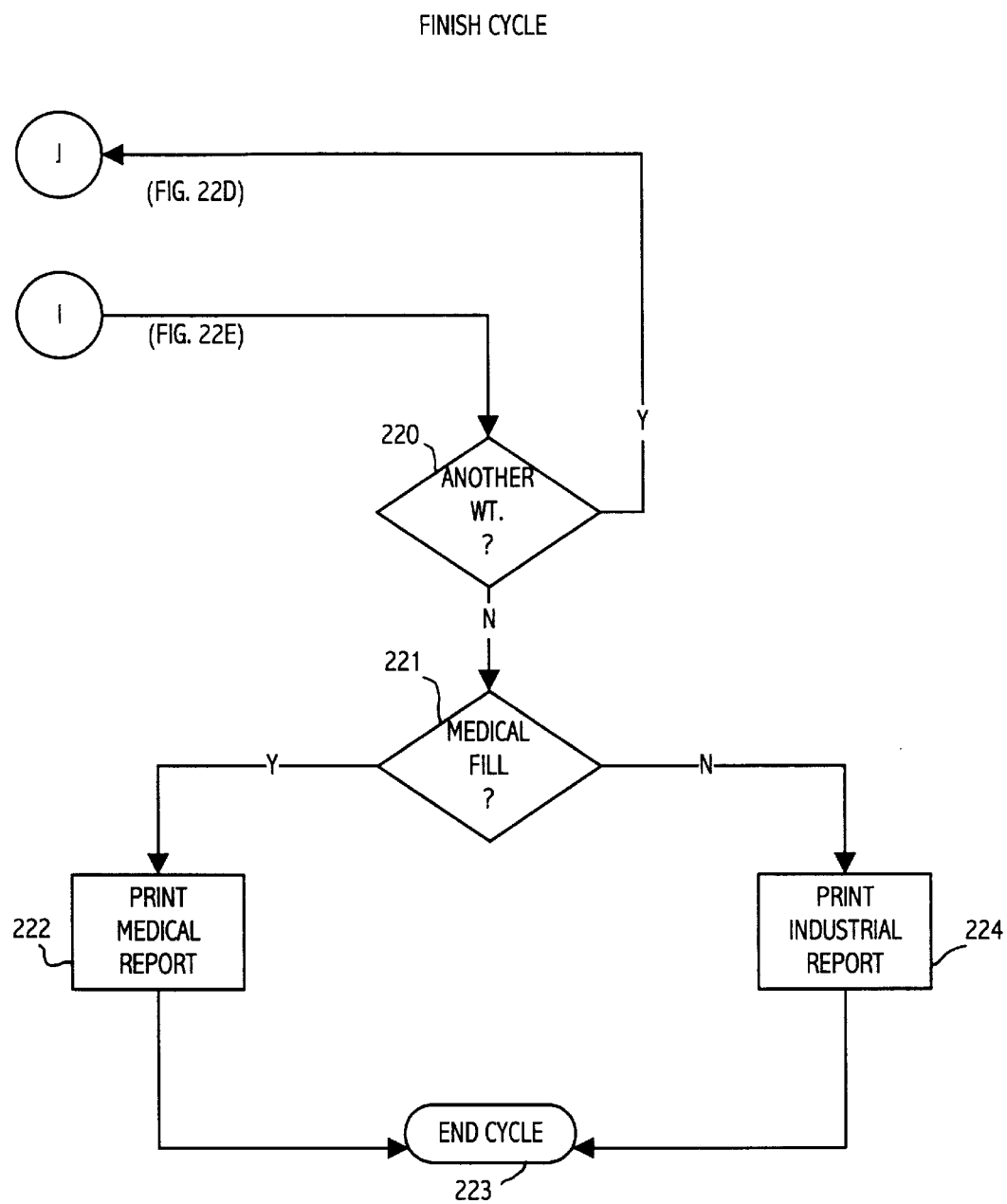

When, at 160, the purge count is equal to the requested number of purges, indicating that the selected number of purges has been completed, the routine enters the fill cycle of FIG. 22D. (If the selected number of purges is zero, the decision would be "yes" when this routine is first entered and the system would skip immediately to the Fill Cycle without doing a purge.) The routine first, at 180–183 checks to see that the control air, the scales and the pressure and temperature transducers are all operating normally and, if any of them is not, the system alarms and stops at 184. Otherwise, the routine, at 184, loads the first gas weight set point from the selected formula based on the selected add sequence, starts the fill cycle logic at 185 and then at 186, calculates the target weight for the selected gas based on the requested weight plus the error compensation value. The routine then opens the restricted-flow valve at 187 and then, at 188, determines the full-flow valve opening weight for the requested gas and checks at 189 to see if the requested weight is above the full-flow valve opening weight. If it is, the full-flow valve is opened at 190 and then, at 191, the routine waits the Bleed Valve Close Delay time before closing the selected bleed valve at 192. If, at 189, the requested weight is not above the full-flow valve opening weight, the routine proceeds immediately to 191 and does not open the full-flow valve. Next, the routine at 193, waits the Gas Valve Open Delay time before opening the selected gas block valve at 194. The routine then checks at 195 to see if the gas flow rate is less than the Flow Increase Per 10-Sec set point (set in FIG. 12) and, if it is, then waits the Gas Pump Start Delay time at 196 before starting the selected one of the gas pumps 45–49 at 199.

Next, at 198 (FIG. 22E) the routine checks to see if gas is flowing in the manifolds and, if not, alarms and stops at 199. Otherwise, the routine calculates the full-flow valve closing weight based upon the requested target weight plus the error compensation value minus the Close Full-Flow Early weight (set in FIG. 12). If, at 195, the gas flow had been adequate, the routine would not start the gas pump and would, instead, skip immediately to 200. Then, at 201, the routine check to see if the pressure registered by the pressure transducer 53A, 53B is greater than 1,000 psi and, if so, signals a 15-second alarm at 202. Otherwise, the routine then checks at 203 to see if the scale 52A, 52B is registering a weight greater than or equal to the full-flow valve closing weight. If not, the routine returns to 195 (FIG. 22D) and, if so, proceeds to close the full-flow valve at 204. Then, at 205, the routine checks to see if the scale reading is greater than or equal to the target weight for the requested gas. When it is, the routine stops the selected gas pump at 206 and then waits the Restricted-Flow Valve Close Delay time at 207 before closing the restricted-flow valve at 208, and then waits the Gas Valve Close Delay time at 209 before closing the selected gas valve at 210.

Then the routine waits the Bleed Valve Open Delay time at 211 before opening the selected bleed valve at 212. Then the routine waits the At Weight Settle Time (FIG. 10) at 213 and then, at 214, calculates the error compensation adjustment for the current formula and gas and saves it to memory and then, at 215, calculates the minimum/maximum tolerance weights based on the requested target weight plus the error compensation value plus or minus the tolerance percentage from the tolerance table of FIG. 16. Then, the routine checks at 216 to see if the actual measured weight is within tolerance. If not, the routine alarms and stops the auto cycle at 217 if the weight is above the tolerance level and, if it is under, returns to 186 of the fill cycle (FIG. 22D) to recalculate the target weight. If, at 216, the actual measured weight is within tolerance, the routine adds one to the gas add order at 218 and then proceeds to the finish cycle of FIG. 22F.

In the finish cycle, the routine first checks at 220 to see if there is another gas weight to be added. If so, the routine returns to the fill cycle at 180 (FIG. 22D) to add the next gas in the mixture. If there is no other gas weight at 220, the routine drops to 221 and checks to see if this fill order is for a medical gas and, if so, prints the appropriate medical report at 222 and ends the cycle at 223, otherwise it prints an industrial gas report at 224 before ending the cycle at 223.

If, at any time during the filling process, that is during venting, evacuating or filling, any of the alarm conditions occurs, e.g., the pressure exceeds the "High Pressure Alarm" or the temperature exceeds the "High Cylinder Temp" set points entered into the screens in FIGS. 12 or 13, or if the rate of change of pressure, for example, is not as previously selected, then an audible alarm will be emitted and a drop box (not shown) will display "Vacuum System Alarm" or "High Cyl. Temp. Alarm" or "Fill Pump Alarm", as the case may be. The valves will close, the pumps will be turned off and the system will pause until the problem is corrected. The operator touches the "ALARM SILENCE" box in the screen of FIG. 5 to turn off the alarm. After the problem is corrected, the operator touches the box 109, whereupon the program resumes where it left off. While alarm checks are shown at specific points in the flow charts for purposes of illustration, preferably the alarm checks are continually run and the system will be interrupted any time an alarm condition occurs.

It will be appreciated that the pressure in a cylinder is only meaningful at a particular temperature. The standard temperature in the industry is commonly 70° F. Thus, e.g., when using the screen of FIG. 15 and a fill pressure is selected, it is assumed that the target pressure is at 70° F. The processor 85 is programmed to take into consideration the temperature of the product cylinders so that the pressure in the cylinders will actually be the selected pressure at 70° F.

Once the cylinders are filled to the desired pressure/weight, the manual valves 32A, 32B and 34A, 34B are closed. The box 109 (FIG. 5) is then touched to open vent valve 54A, 54B to vent pressure in the system. Then the product cylinders 31A, 31B are removed and replaced by "empty" cylinders for the next filling operation.

The foregoing explanation was in respect to filling cylinders by touching the "Start/Running" box 109 of FIG. 5 associated with a particular manifold. With the system depicted in FIG. 1, that is, with multiple sources and two vacuum pumps, if the "Start/Running" box 109 associated with the second manifold was touched, cylinders 31B would be substantially simultaneously filled with gas corresponding to the formula selected. The two system sections 30A and 30B would act independently. While system sections 30A and 30B operate substantially simultaneously, it will be appreciated that a single one of the gas pumps 45–49 cannot simultaneously fill cylinders in both sections. Thus, if a particular formula happens to call for a particular gas pump at the same time in both sections, the program of the processor 85 will arbitrate the conflict by fulfilling the filling requirement in section 30A and then fulfilling the requirement in section 30B.

Figure 2:
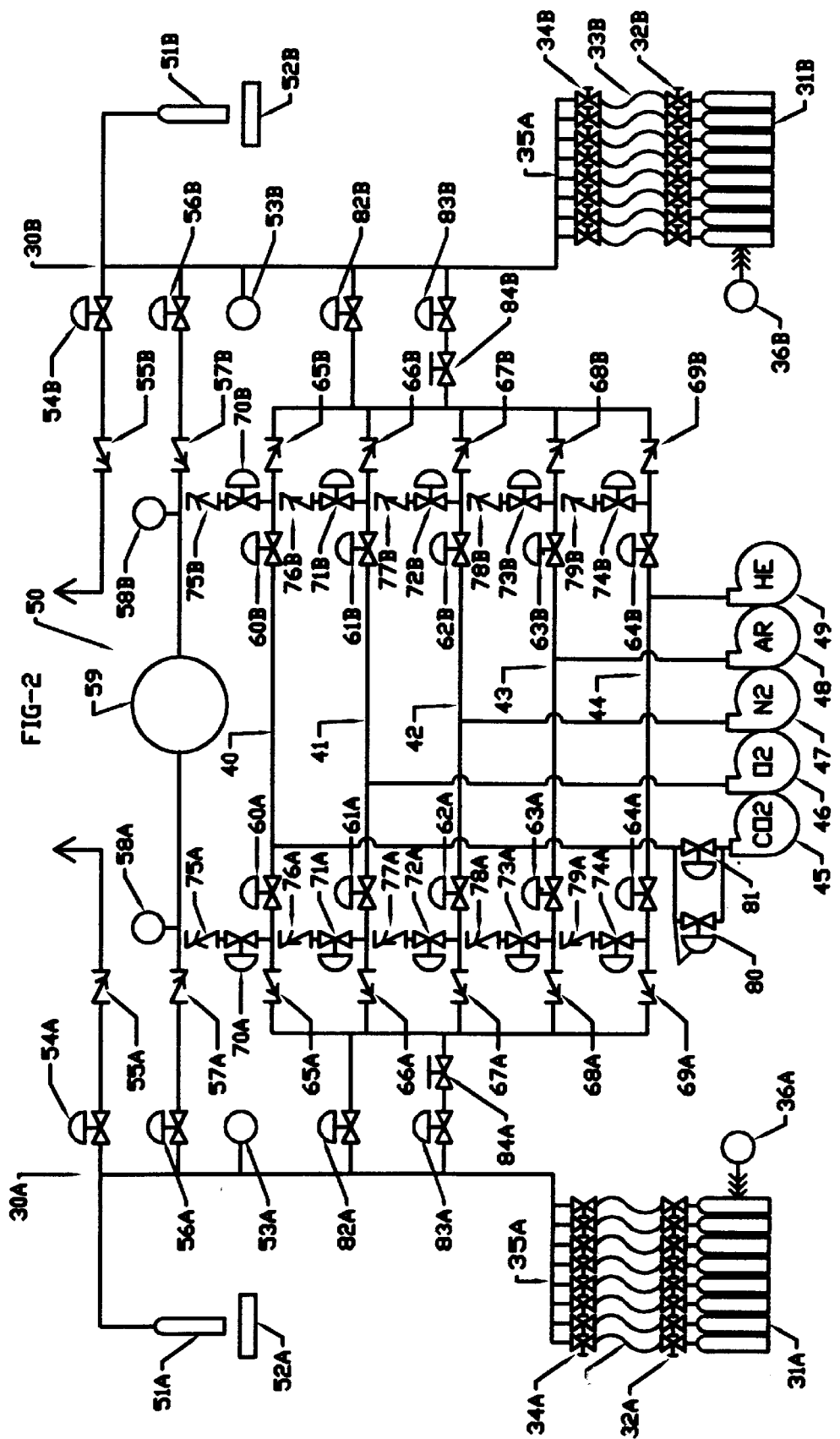
FIG. 2 depicts a variation of the system of FIG. 1.

It will be appreciated that a similar conflict could arise when using the modified system of FIG. 2, wherein a single vacuum pump 59 is utilized. Thus, both sections 30A and 30B cannot be evacuated simultaneously so, if evacuation is called for in both sections at the same time, the system will first evacuate section 30A and then evacuate section 30B.

Reports

The system also accommodates printing of reports. To do so, the operator returns to the menu of FIG. 4 and touches the "Weighing Reports" box, which brings up the screen of FIG. 7 to enable him to select reports to print.

Touching the "PRODUCTION" box brings up the "PRODUCTION REPORT" of screen 18. Touching the "GAS RECAP" box brings up the "PRODUCTION RECAP GAS REPORT" of FIG. 19.

Particular reports must be submitted to the FDA for gas used in the medical field, including statements that the cylinders were checked, inspection made and other tests performed. The responses by the operator are stored, as previously explained. When it is time to print a report, those responses are printed. If the gas fill is with medical gases FDA reports print automatically when the fill cycle is completed. FIG. 20 illustrates a Gas Mixture & Analysis Record, which is printed automatically at the end of each fill cycle, without any user selection.

Manual Operation

Figure 6:
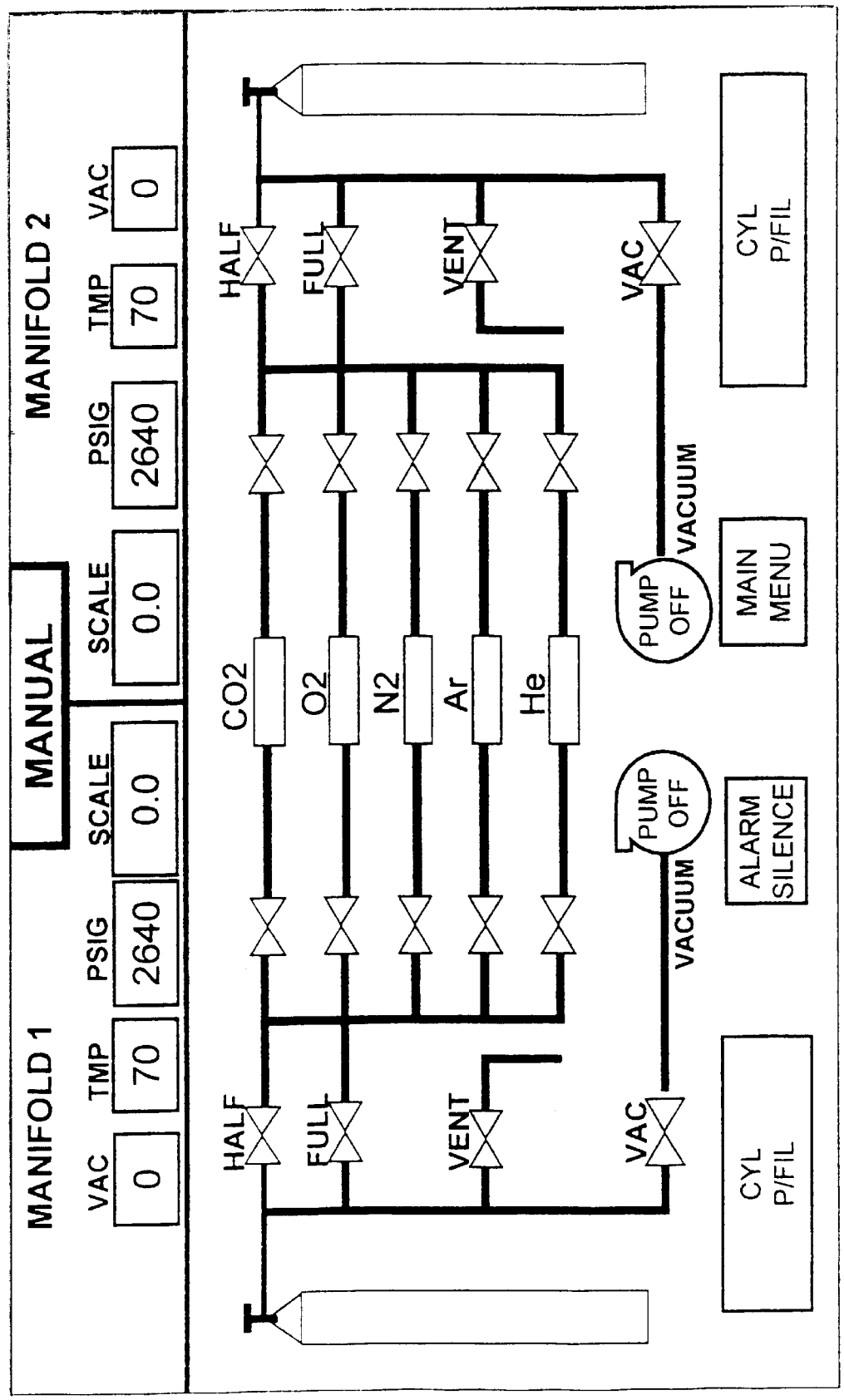

Instead of filling the cylinders automatically, using the computer control routine described above, the operator could fill the cylinders manually, in which case he returns to the menu of FIG. 4 and touches the "Manual Weight Filling" box, whereupon a screen somewhat similar to that of FIG. 6 appears. This screen is similar to the "Auto Weigh Filling" screen of FIG. 5, except there are no "Target" or "S/TM" boxes and certain other boxes along the bottom of FIG. 5 would not appear. The operator, in sequence, touches the gas type box to select the gas type, makes the cylinder pre-fill inspection, and makes the entry in the record section. Then, the operator touches the valve icons as he wants to open and close them and touches the pump icons as he wants to turn the pumps on and off. Preferably, certain of the pre-set delay times, described above in the automatic mode, are also operational in the manual mode.

From the foregoing, it can be seen that there has been provided improved controller for a gas container-filling system. The controller is easily programmable by the operator who owns the system, who can configure the controller to match the configuration of his plant operation. Since pumps are expensive, the operator may initially utilize a single vacuum pump and a single fill pump for each gas, and the processor 85 can be programmed accordingly. Later, if business improves, the operator can add additional vacuum pumps and/or gas pumps for additional manifolds and can then modify the processor program accordingly relatively easily. He does not have to shut down the system for any appreciable length of time, nor does he need to return the software package to the manufacturer for modification. The manufacturer can produce a single controller adaptable for all customers, rather than making individual controllers to customer order.

If a component, such as a transducer, needs to be repaired or replaced, the specifications of the new transducer can be readily programmed into the controller 50, again with a minimum of lost time and without having to return the software to the manufacturer. The controller permits reports to be printed with all details about the cylinders being filled, their contents and the like, and, in the case of cylinders being filled with gas for medical purposes, the reports will comply with FDA regulations by providing confirmation of required pre-filling, filling and post-filling activities by the system and the operator.

The controller 50 permits an operator to fill containers with a variety of single-component or multiple-component gas formulas. These gases or gas mixtures can include various concentrations of gases and cylinders can be filled to different pressures and the system permits cylinders of different sizes to be filled at the same time. The system automatically performs the necessary calculations to convert percentage gas mixture requests to individual gas weight adds and to calculate maximum fill pressures if condensable gases are present in the mixture. The controller also provides visual and audible alarms when certain temperatures and pressures are exceeded and when components, such as pumps and transducers, are not operating properly. The controller also automatically compensates for differences in the actual settle weights of gas additions as compared to the target weights, and continually adjusts the stop weight to allow the actual weight to settle and be equal to the target weight. The system also permits the user-setting for each gas, of the weight at which the fill rate will be slowed from a full-flow rate to a restricted-flow rate, and also permits user selection of the purge gas, as well as the number of purge cycles to be used.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A controller for a container filling system which includes plural conduits for respectively coupling to sources of a plurality of different compressed gases, a manifold coupled to the conduits and adapted to be coupled to plural product containers to be filled, and pumps respectively coupled between the sources and the conduits, the controller comprising:

valves connected between the conduits and the manifold, a reference container communicating with the manifold, a weight sensor coupled to the reference container for providing a weight signal representative of the weight of gas in the reference container, a user interface, and a processor coupled to the pumps and to the weight sensor and to the valves and to the user interface and executing a stored program routine automatically to operate the pumps and the valves for filling the product containers with a gas load in accordance with a predetermined formula which specifies the proportions of the gases in the load and the order in which they are to be added to the product containers, the program routine including (a) a portion responsive to the user interface for establishing and storing the formula, (b) a portion for calculating the weight of each gas to be added based upon the formula proportions, and (c) a portion responsive to the weight signal and the calculated weights for selectively actuating the pumps and the valves for filling the reference container with the calculated gas weights and simultaneously filling the product containers in accordance with the formula.

2. The controller of claim 1, wherein said user interface includes a display device for displaying system operating parameters.

3. The controller of claim 2, wherein said display device includes a touch screen display for user entry of data and instructions.

4. The controller of claim 1, wherein the filling system includes plural manifolds each coupled to the conduits and respectively adapted to be coupled to different pluralities of product containers to be filled, said valves including valves connected between the conduits and each of the manifolds.

5. The controller of claim 4, wherein the program routine includes a portion operable for controlling filling through said manifolds independently of one another and substantially simultaneously.

6. The controller of claim 4, and further comprising plural evacuation pumps respectively coupled to said manifolds for evacuating the containers, said processor being coupled to said evacuation pumps and said program routine including a portion for controlling evacuation of the containers.

7. The controller of claim 1, wherein the formula includes a predetermined target amount of each gas in the load, portion (c) of the program routine including a portion for stopping filling when the target amount of gas is in the product cylinders, and a portion waiting a predetermined settling time after the target amount of gas is in the product cylinders and then rechecking the weight signal and, if the amount of gas indicated by the rechecked weight signal has dropped below the target amount by a variance amount, correcting the target amount by a predetermined fraction of the variance amount.

8. The controller of claim 1, and further comprising a pressure transducer coupled to the manifold for providing a pressure signal representing the pressure therein, vent means for venting the containers, and evacuation means for evacuating the containers, the program routine including a portion operative to cause the vent means to vent the containers and a portion operative to cause the evacuation means to evacuate the containers, and a portion operative to cause a predetermined number of purging cycles to be performed, each purging cycle including filling the containers to a predetermined pressure with a selected one of the gases and then venting the containers and then evacuating the containers, the program routine being field adjustable to enable user selection of the purging gas.

9. The controller of claim 1, wherein said valves include a full-flow valve and a restricted-flow valve, portion (c) of the program routine including a portion for filling the containers through only the restricted-flow valve if the calculated gas weight is below a threshold level and a portion operative if the calculated gas weight is at or above the threshold level for initially filling the containers through both the full-flow valve and the restricted-flow valve until a predetermined fraction of the calculated gas weight is reached, and then completing filling through only the restricted-flow valve, and a portion field configurable for user selection of the predetermined fraction.

10. The controller of claim 1, wherein the program routine includes a portion operative to provide reports on the number of cylinders to be filled, the volumes of the cylinders, the identification of the gases and the amount of each gas in the gas load, the total volume of the gas load, the volume of each gas in a gas load for a given container, and the total volume of each gas used to fill all of the containers.

11. A controller for a container filling system which includes a conduit for coupling to a source of compressed gas and to a product container to be filled, and a pump coupled between the source and the conduit, the controller comprising:

at least one valve coupled in the conduit, a transducer for producing a signal representative of the amount of gas in the product container, and a processor coupled to the transducer and to the pump and to the at least one valve and executing a stored program routine automatically to operate the pump and the at least one valve for filling the product container with a predetermined target amount of gas, the routine including (a) a first portion responsive to the transducer signal for stopping filling when the target amount of gas is in the product cylinder, and (b) a portion waiting a predetermined settling time after the target amount of gas is in the product cylinder and then rechecking the transducer signal and, if the amount of gas in the product container as indicated by the transducer signal has dropped below the target amount by a variance amount, correcting the target amount by a predetermined fraction of the variance amount.

12. The controller of claim 11, wherein the program routine includes a portion establishing a tolerance level defining the limit of acceptable difference between the target amount and the amount in the container after settling, and a portion responsive to the transducer signal after settling for resuming filling if the amount of gas in the cylinder is less than the target amount by more than the tolerance level.

13. The controller of claim 12, and further comprising a user interface coupled to the processor, the program routine including a portion responsive to the user interface for user selection of the tolerance level.

14. The controller of claim 11, wherein the transducer is a weight sensor.

15. The controller of claim 14, and further comprising a reference container communicating with the manifold, the weight sensor being coupled to the reference container for providing a weight signal representative of the weight of gas in the reference container, the program routine including a portion responsive to the weight signal for selectively actuating the pump and the valves for simultaneously filling the reference container and the product containers.

16. The controller of claim 11, and further comprising a user interface coupled to the processor, the program routine including a portion responsive to the user interface for user selection of the predetermined settling time.

17. The controller of claim 16, wherein the program routine includes a portion responsive to the user interface for user selection of the predetermined fraction.

18. A controller for a container filling system which includes plural conduits for respectively coupling to sources of a plurality of different compressed gases, a manifold coupled to the conduits and adapted to be coupled to plural product containers to be filled, and pumps respectively coupled between the sources and the conduits, the controller comprising:

a pressure transducer coupled to the manifold for providing a pressure signal representing the pressure therein, vent means for venting the containers, evacuation means for evacuating the containers, and a processor coupled to the pressure transducer and to the vent means and to the evacuation means and to the pumps and executing a computer routine automatically to operate the vent means and the evacuation means and the pumps, the computer routine including (a) a first portion operative to cause the vent means to vent the containers, (b) a second portion operative to cause the evacuation means to evacuate the containers, (c) a third portion operative to cause the pumps to fill the containers with compressed gas, and (d) a fourth portion operative to cause a predetermined number of purging cycles to be performed, each purging cycle including filling the containers to a predetermined pressure with a selected one of the gases and then venting the containers and then evacuating the containers, the program routine being field adjustable to enable user selection of the purging gas.

19. The controller of claim 18, wherein the program routine is field adjustable to enable user selection of the number of purging cycles.

20. The controller of claim 18, wherein the filling system includes plural manifolds each coupled to the conduits and respectively adapted to be coupled to different pluralities of product containers to be filled, and valves connected between the conduits and each of the manifolds.

21. The controller of claim 20, wherein the program routine includes a portion operable for controlling filling through said manifolds independently of one another and substantially simultaneously.

22. The controller of claim 20, wherein said evacuation means includes plural evacuation pumps respectively coupled to said manifolds for evacuating the containers, said processor being coupled to said evacuation pumps for controlling evacuation of the containers.

23. The controller of claim 20, wherein said evacuation means includes a single vacuum pump coupled to one of said manifolds.

24. The controller of claim 18, wherein the program routine is field adjustable to enable user selection of the purging pressure for each gas.

25. The controller of claim 18, wherein the program routine includes a portion for generating an alarm signal if the evacuation means operates for too short a time period.

26. A controller for a container filling system which includes plural conduits for respectively coupling to sources of a plurality of different compressed gases, a manifold coupled to the conduits and adapted to be coupled to plural product containers to be filled, and pumps respectively coupled between the sources and the conduits, the controller comprising:
  a full-flow valve and a restricted-flow valve connected between said manifold and said conduits,
  a transducer for producing a signal representative of the amount of gas in each of the product containers, and
  a processor coupled to the pumps and to the transducer and to the valves and executing a stored program routine automatically to operate the pumps and the valves for filling the product containers with a predetermined amount of gas, the program routine including (a) a first portion for filling the container through only the restricted-flow valve if the predetermined amount is below a threshold level, (b) a second portion operative if the predetermined amount is at or above the threshold level for initially filling the container through both the full-flow valve and the restricted-flow valve until a predetermined fraction of the predetermined amount is reached, and then completing filling through only the restricted-flow valve, and (c) a third portion field configurable for user selection of the threshold level and the predetermined fraction for each gas.

27. The controller of claim 26, and further comprising a pressure transducer coupled to the manifold for providing a pressure signal representing the pressure therein, the program routine including a portion establishing a back pressure threshold level for the product containers, the first portion of the program routine including a portion operative when the gas being added to the product container is carbon dioxide for preventing actuation of the pump corresponding to the carbon dioxide source until the back pressure threshold level is reached.

28. The controller of claim 26, and further comprising gas valves respectively coupled between the pumps and the conduits.

29. The controller of claim 28, and further comprising bleed valves respectively coupled between the conduits and atmosphere.

30. The controller of claim 29, and further comprising check valves respectively connected in series with the gas valves and the bleed valves.

31. The controller of claim 26, and further comprising a temperature sensor coupled to the product containers and to the processor, the program routine including a portion responsive to the temperature sensor for generating an alarm signal if the product container temperature exceeds a predetermined threshold level.

32. The controller of claim 26, and further comprising a pressure transducer coupled to the manifold and to the processor, the program routine including a portion responsive to the pressure transducer for generating an alarm signal if the pressure exceeds a predetermined threshold level.

33. A controller for a container filling system which includes plural conduits for respectively coupling to sources of a plurality of different compressed gases, a manifold coupled to the conduits and adapted to be coupled to plural product containers to be filled, and pumps respectively coupled between the sources and the conduits, the controller comprising:
  valves connected between the conduits and the manifold,
  a reference container communicating with the manifold,
  a weight sensor coupled to the reference container for providing a weight signal representative of the weight of gas in the reference container,
  a user interface, and
  a processor coupled to the pumps and to the weight sensor and to the valves and to the user interface automatically to operate the pumps and the valves for filling the product containers with a gas load in accordance with a predetermined formula which specifies the proportions of the gases in the load and the order in which they are to be added to the product containers, the processor including (a) means responsive to the user interface for establishing and storing the formula, (b) means for calculating the weight of each gas to be added based upon the formula proportions, and (c) means responsive to the weight signal and the calculated weights for selectively actuating the pumps and the valves for filling the reference container with the calculated gas weights and simultaneously filling the product containers in accordance with the formula.

34. The controller of claim 33, wherein said user interface includes a display device for displaying system operating parameters.

35. The controller of claim 34, wherein said display device includes a touch screen display for user entry of data and instructions.

36. The controller of claim 33, wherein the filling system includes plural manifolds each coupled to the conduits and respectively adapted to be coupled to different pluralities of product containers to be filled, said valves including valves connected between the conduits and each of the manifolds.

37. The controller of claim 36, wherein the processor includes means operable for controlling filling through said manifolds independently of one another and substantially simultaneously.

38. The controller of claim 36, and further comprising plural evacuation pumps respectively coupled to said manifolds for evacuating the containers, said processor being coupled to said evacuation pumps and said program routine including a portion for controlling evacuation of the containers.

39. The controller of claim 33, wherein the formula includes a predetermined target amount of each gas in the load, means (c) of the processor including means for stopping filling when the target amount of gas is in the product cylinders, and means waiting a predetermined settling time after the target amount of gas is in the product cylinders and then rechecking the weight signal and, if the amount of gas indicated by the rechecked weight signal has dropped below the target amount by a variance amount, correcting the target amount by a predetermined fraction of the variance amount.

40. The controller of claim 33, and further comprising a pressure transducer coupled to the manifold for providing a pressure signal representing the pressure therein, vent means for venting the containers, and evacuation means for evacuating the containers, the processor including means operative to cause the vent means to vent the containers and means operative to cause the evacuation means to evacuate the containers, and means operative to cause a predetermined number of purging cycles to be performed, each purging cycle including filling the containers to a predetermined pressure with a selected one of the gases and then venting the containers and then evacuating the containers, the processor being field adjustable to enable user selection of the purging gas.

41. The controller of claim 33, wherein said valves include a full-flow valve and a restricted-flow valve, means (c) of the processor including means for filling the containers through only the restricted-flow valve if the calculated gas weight is below a threshold level and means operative if the calculated gas weight is at or above the threshold level for initially filling the containers through both the full-flow valve and the restricted-flow valve until a predetermined fraction of the calculated gas weight is reached, and then completing filling through only the restricted-flow valve, and means field configurable for user selection of the predetermined fraction.

42. The controller of claim 33, wherein the processor includes means operative to provide reports on the number of cylinders to be filled, the volumes of the cylinders, the identification of the gases and the amount of each gas in the gas load, the total volume of the gas load, the volume of each gas in a gas load for a given container, and the total volume of each gas used to fill all of the containers.

43. A controller for a container filling system which includes a conduit for coupling to a source of compressed gas and to a product container to be filled, and a pump coupled between the source and the conduit, the controller comprising:
 at least one valve coupled in the conduit,
 a transducer for producing a signal representative of the amount of gas in the product container, and
 a processor coupled to the transducer and to the pump and to the at least one valve automatically to operate the pump and the at least one valve for filling the product container with a predetermined target amount of gas, the processor including (a) means responsive to the transducer signal for stopping filling when the target amount of gas is in the product cylinder, and (b) means waiting a predetermined settling time after the target amount of gas is in the product cylinder and then rechecking the transducer signal and, if the amount of gas in the product container as indicated by the transducer signal has dropped below the target amount by a variance amount, correcting the target amount by a predetermined fraction of the variance amount.

44. The controller of claim 43, wherein the processor includes means establishing a tolerance level defining the limit of acceptable difference between the target amount and the amount in the container after settling, and means responsive to the transducer signal after settling for resuming filling if the amount of gas in the cylinder is less than the target amount by more than the tolerance level.

45. The controller of claim 44, and further comprising a user interface coupled to the processor, the processor including means responsive to the user interface for user selection of the tolerance level.

46. The controller of claim 43, wherein the transducer is a weight sensor.

47. The controller of claim 46, and further comprising a reference container communicating with the manifold, the weight sensor being coupled to the reference container for providing a weight signal representative of the weight of gas in the reference container, the processor including means responsive to the weight signal for selectively actuating the pump and the valves for simultaneously filling the reference container and the product containers.

48. The controller of claim 43, and further comprising a user interface coupled to the processor, the processor including means responsive to the user interface for user selection of the predetermined settling time.

49. The controller of claim 48, wherein the processor includes means responsive to the user interface for user selection of the predetermined fraction.

50. A controller for a container filling system which includes plural conduits for respectively coupling to sources of a plurality of different compressed gases, a manifold coupled to the conduits and adapted to be coupled to plural product containers to be filled, and pumps respectively coupled between the sources and the conduits, the controller comprising:
 a pressure transducer coupled to the manifold for providing a pressure signal representing the pressure therein,
 vent means for venting the containers,
 evacuation means for evacuating the containers, and
 a processor coupled to the pressure transducer and to the vent means and to the evacuation means and to the pumps automatically to operate the vent means and the evacuation means and the pumps, the processor including (a) means operative to cause the vent means to vent the containers, (b) means operative to cause the evacuation means to evacuate the containers, (c) means operative to cause the pumps to fill the containers with compressed gas, and (d) means operative to cause a predetermined number of purging cycles to be performed, each purging cycle including filling the containers to a predetermined pressure with a selected one of the gases and then venting the containers and then evacuating the containers, the processor routine being field adjustable to enable user selection of the purging gas.

51. The controller of claim 50, wherein the processor is field adjustable to enable user selection of the number of purging cycles.

52. The controller of claim 50, wherein the filling system includes plural manifolds each coupled to the conduits and respectively adapted to be coupled to different pluralities of product containers to be filled, and valves connected between the conduits and each of the manifolds.

53. The controller of claim 52, wherein the program routine includes means operable for controlling filling through said manifolds independently of one another and substantially simultaneously.

54. The controller of claim 52, wherein said evacuation means includes plural evacuation pumps respectively coupled to said manifolds for evacuating the containers, said processor being coupled to said evacuation pumps for controlling evacuation of the containers.

55. The controller of claim 52, wherein said evacuation means includes a single vacuum pump coupled to one of said manifolds.

56. The controller of claim 50, wherein the processor is field adjustable to enable user selection of the purging pressure for each gas.

57. The controller of claim 50, wherein the processor includes means for generating an alarm signal if the evacuation means operates for too short a time period.

58. A controller for a container filling system which includes plural conduits for respectively coupling to sources of a plurality of different compressed gases, a manifold coupled to the conduits and adapted to be coupled to plural product containers to be filled, and pumps respectively coupled between the sources and the conduits, the controller comprising:
 a full-flow valve and a restricted-flow valve connected between said manifold and said conduits, a transducer for producing a signal representative of the amount of gas in each of the product containers, and a processor coupled to the pumps and to the transducer and to the valves automatically to operate the pumps and the valves for filling the product containers with a predetermined amount of gas, the processor including (a) means for filling the container through only the restricted-flow valve if the predetermined amount is below a threshold level, (b) means operative if the predetermined amount is at or above the threshold level for initially filling the container through both the full-flow valve and the restricted-flow valve until a predetermined fraction of the predetermined amount is reached, and then completing filling through only the restricted-flow valve, and (c) means field configurable for user selection of the threshold level and the predetermined fraction for each gas.

59. The controller of claim 58, and further comprising a pressure transducer coupled to the manifold for providing a pressure signal representing the pressure therein, the processor including means establishing a back pressure threshold level for the product containers, means (a) of the processor including means operative when the gas being added to the product container is carbon dioxide for preventing actuation of the pump corresponding to the carbon dioxide source until the back pressure threshold level is reached.

60. The controller of claim 58, and further comprising gas valves respectively coupled between the pumps and the conduits.

61. The controller of claim 60, and further comprising bleed valves respectively coupled between the conduits and atmosphere.

62. The controller of claim 61, and further comprising check valves respectively connected in series with the gas valves and the bleed valves.

63. The controller of claim 58, and further comprising a temperature sensor coupled to the product containers and to the processor, the processor including means responsive to the temperature sensor for generating an alarm signal if the product container temperature exceeds a predetermined threshold level.

64. The controller of claim 58, and further comprising a pressure transducer coupled to the manifold and to the processor, the processor including means responsive to the pressure transducer for generating an alarm signal if the pressure exceeds a predetermined threshold level.

* * * * *